United States Patent
Tangren

[19]

[11] Patent Number: 6,154,952
[45] Date of Patent: Dec. 5, 2000

[54] ATTACHMENT ISOLATION STRUCTURES FOR ADJUSTING HEAD SLIDER STATIC ATTITUDE

[75] Inventor: John H. Tangren, St. Paul, Minn.

[73] Assignee: Hutchinson Technology, Inc., Hutchinson, Minn.

[21] Appl. No.: 09/064,372

[22] Filed: Apr. 22, 1998

[51] Int. Cl.[7] ............................................. G11B 5/127
[52] U.S. Cl. ........................ 29/603.04; 360/103; 360/104
[58] Field of Search ........................... 29/603.04, 896.9; 360/103, 104

[56] References Cited

U.S. PATENT DOCUMENTS

| | | |
|---|---|---|
| 4,603,567 | 8/1986 | Smith et al. . |
| 4,723,186 | 2/1988 | Nakajima et al. . |
| 4,949,194 | 8/1990 | MacPherson et al. . |
| 5,126,904 | 6/1992 | Sakurai . |
| 5,198,945 | 3/1993 | Blaeser et al. . |
| 5,228,324 | 7/1993 | Frackiewicz et al. .................. 72/342.1 |
| 5,256,850 | 10/1993 | Maegawa et al. . |
| 5,268,805 | 12/1993 | Peng et al. . |
| 5,297,413 | 3/1994 | Schones et al. ........................ 72/342.1 |
| 5,299,081 | 3/1994 | Hatch et al. . |
| 5,347,415 | 9/1994 | Murata et al. . |
| 5,461,525 | 10/1995 | Christianson et al. . |
| 5,473,488 | 12/1995 | Gustafson et al. ....................... 360/104 |
| 5,521,778 | 5/1996 | Boutaghou et al. . |
| 5,537,269 | 7/1996 | Zarouri ................................. 360/37.01 |
| 5,588,200 | 12/1996 | Schudel . |
| 5,608,590 | 3/1997 | Ziegler et al. . |
| 5,661,619 | 8/1997 | Goss ....................................... 360/104 |
| 5,663,854 | 9/1997 | Grill et al. . |
| 5,682,780 | 11/1997 | Girard . |
| 5,687,597 | 11/1997 | Girard . |
| 5,712,483 | 1/1998 | Singh et al. ........................... 219/121.6 |
| 5,729,889 | 3/1998 | Goss . |
| 5,748,409 | 5/1998 | Girard et al. ............................ 360/104 |
| 5,786,961 | 7/1998 | Goss ........................................ 360/104 |
| 5,787,570 | 8/1998 | Ressmeyer et al. ................. 29/603.09 |
| 5,818,662 | 10/1998 | Shum ....................................... 360/104 |
| 5,842,270 | 12/1998 | Tucker et al. .............................. 29/705 |
| 6,011,239 | 1/2000 | Singh et al. ........................... 219/121.6 |

FOREIGN PATENT DOCUMENTS

| | | |
|---|---|---|
| 0 632 435 | 4/1995 | European Pat. Off. . |
| 671727 | 9/1995 | European Pat. Off. .......... G11B 5/60 |
| 60-187977 | 9/1985 | Japan . |

*Primary Examiner*—David P. Bryant
*Assistant Examiner*—Essama Omgiba
*Attorney, Agent, or Firm*—Faegre & Benson LLP

[57] ABSTRACT

A method of adjusting the static attitude of a head slider attached to a head suspension for use in a rigid disk drive. The head suspension includes a load beam having a mounting region, a rigid region, and a spring region. The head suspension also includes a flexure for supporting a head slider having a read/write head. The flexure is attached to the load beam at at least an attachment isolation structure. The attachment isolation structure includes an attachment area at which the flexure is attached to the load beam; at least one slot surrounding the attachment area; and at least one junction tab traversing the slot to connect the attachment area to the remainder of the head suspension. The attachment area can be displaced by permanently deforming the junction tab. Displacement of the attachment area places a torque on the flexure which causes a displacement, e.g. adjustment, of the head slider attached thereto.

25 Claims, 18 Drawing Sheets

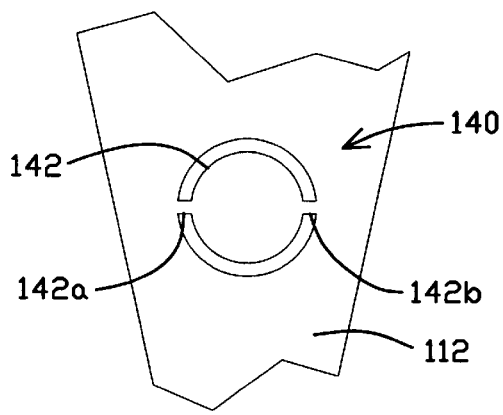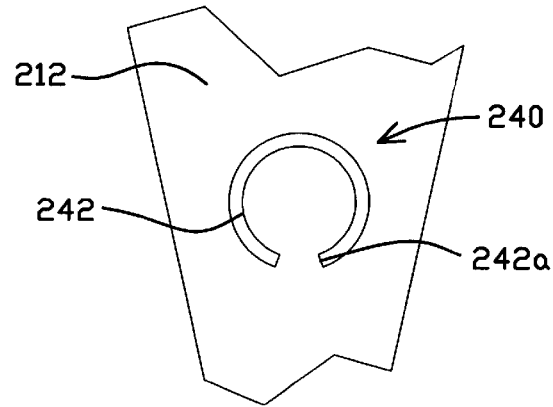
FIGURE 8    FIGURE 9
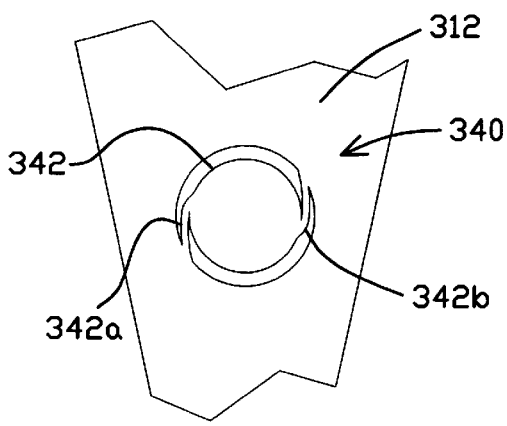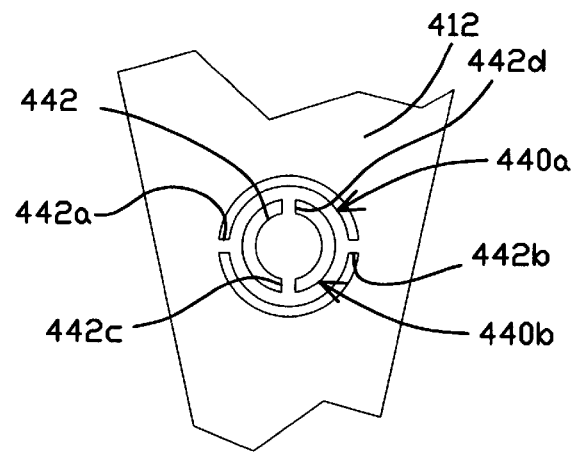
FIGURE 10    FIGURE 11

ATTACHMENT ISOLATION STRUCTURES FOR ADJUSTING HEAD SLIDER STATIC ATTITUDE

BACKGROUND

1. Technical Field

The present invention relates to a method for adjusting certain performance characteristics of head suspensions used in rigid disk drives. In particular, the present invention includes a method for adjusting the static attitude of head sliders used on rigid disk drive type head suspensions.

2. Background of the Invention

Head suspensions are well known and commonly used within dynamic magnetic or optical information storage devices or drives with rigid disks. The head suspension is a component within the disk drive which positions a magnetic or optical read/write head over a desired position on the storage media where information is to be retrieved (read) or transferred (written). Head suspensions for use in rigid disk drives typically include a load beam that generates a spring force and supports a flexure. The flexure has a slider bond pad to which a head slider supporting a read/write head is to be mounted. The load beam typically includes a base at a proximal end, a rigid region at a distal end, and a spring region between the rigid region and the base for providing the spring force. Head suspensions are normally combined with an actuator arm or E-block to which the base of the load beam is mounted so as to position (by linear or rotary movement) the head suspension, and thus the head slider and read/write head, with respect to data tracks of the rigid disk.

The head slider is aerodynamically designed so as to allow the head slider to "fly" on an air bearing generated by the spinning rigid storage disk. The spring force urges the head slider in a direction opposing the force generated by the air bearing. The point at which these two forces are balanced during operation is the "fly height" of the head slider. The flexure permits pitch and roll motion of the head slider and read/write head as hey move over the data tracks of the disk. The flexure does this by providing a gimbal connection between the head slider and load beam. Such a gimbal connection can be provided in numerous ways, including via a flexure which is formed separately from the load beam and then attached thereto and a flexure which is formed integrally with the load beam. One method, which utilizes a separately formed flexure, involves supporting the head slider on a resilient tongue which is in turn supported between resilient lateral arms connected to a flexure mounting region, which is where the flexure connects to the load beam. The slider bond pad is located on the tongue and supports the head slider. The spring force provided by the spring region of the load beam is transferred to the flexure via a load point dimple, which can be a rounded protrusion provided between the load beam and the flexure. The resilient lateral arms allow the gimbal connection of the tongue to move in pitch and roll directions to accommodate surface variations in the spinning magnetic disk over which the slider is flying. The roll axis is a longitudinal axis of the head suspension (typically at its longitudinal center line). The pitch axis is perpendicular to the roll axis, that is, is transverse to the load beam, and crosses the roll axis at or near the head slider.

In order to store and retrieve data from magnetic or optical disks on which data is densely packed, it is necessary for the head slider to fly closely above the surface of the spinning data disk (on the order of 0.1 µm) without colliding with the disk. Further, because of the dense packing of data on magnetic or optical disks, it is important for the read/write head attached to the head slider to be able to read from or write to a relatively small area or spot on the disk.

In relation to this, an important performance criteria of a head suspension is the orientation or attitude of the head slider as it flies over a disk surface. This orientation or attitude can be termed "slider flying attitude" and refers to the positional orientation of the head slider with respect to the surface of the disk when the head suspension is "loaded," that is, under the influence of the balanced forces created by the spring force and the air bearing. When the head suspension is not actually flying over a spinning disk, this loaded state can be simulated. This can be done by applying a force in the same direction as the air bearing force at a point on the head suspension other than the head slider or, if the slider is not attached, a head slider bond pad where the head would be attached. This force is applied to lift the head slider to its loaded position or loaded state at fly height. The orientation or attitude of the head slider or slider bond pad under this simulated loaded state is referred to as "static attitude." The difference or bias between the slider flying attitude and static attitude can be measured for a given head suspension so that a measurement of the static attitude, which can be an easier measurement to make than slider flying attitude, can be used to determine slider flying attitude.

Static attitude of a head slider can be measured with reference to pitch and roll axis of the head suspension. Roll is measured as the amount of rotation of the head slider about the roll axis and pitch is measured as the amount of rotation of the head slider about the pitch axis. The head slider is typically designed to have a predetermined or desired static attitude. Deviations from a desired static attitude can be quantified as pitch and/or roll errors. For pitch or roll errors to exist, there must be a torque or moment of force exerted on the head slider in the direction of rotation of the head slider from its desired static attitude. Such torque can have either or both a pitch component and/or a roll component.

Pitch and roll errors can be caused by manufacturing variations of the head suspension, handling of the head suspension and related components after and during manufacturing, or contamination of the head suspension by airborne foreign matter. If pitch and/or roll errors exist in the static attitude of a head slider, there is a greater possibility that the head slider might impact the disk surface. Further, errors in static attitude of the head slider cause the read/write head to be out of proper orientation to the surface of the disk or closer or further from the disk surface than it is designed to be. As such, the read/write head may not be able to "focus" on as small an area or spot on the disk as necessary to efficiently transfer data to or from the disk. Also, the head can be improperly positioned with respect to a specific track. This can degrade disk drive performance.

Because of the importance of correct head slider static attitude, various methods exist for correcting pitch and roll errors to obtain appropriate static attitude. Such methods are disclosed in, for example, U.S. Pat. No. 5,682,780, issued Nov. 4, 1997 to Girard for "Gram Load, Static Attitude And Radius Geometry Adjusting System For Magnetic Head Suspensions"; U.S. patent application Ser. No. 08/657,778, filed May 31, 1996 for "Gram Load, Static Attitude And Radius Geometry Establishing System For Flat Magnetic Head Suspensions"; U.S. patent application Ser. No. 08/706,792, filed Sep. 3, 1996 for "Gimballing Flexure With Static Compensation And Load Point Integral Etched Features", and U.S. patent application Ser. No. 08/697,923, filed Sep. 3, 1996 for "Method Of Mounting a Head Slider To a Head Suspension With Static Offset Compensation" each of the above are commonly owned by the assignee of the present application, and are fully incorporated herein by reference.

One method of correcting erroneous static attitude of the head slider involves altering the profile of the load beam. In this method, the profile of the load beam can be altered to support the flexure at an attitude to the disk surface which compensates for any erroneous attitude of the head slider. That is, through altering the load beam, the flexure position can be altered to compensate for pitch and/or roll error of the head slider. By adjusting the load beam in this way, however, other head suspension parameters, such as fly height, gram load and resonance profile can be unnecessarily affected. Further, it is known to form electrical leads on the load beam for carrying electronic read/write signals from the read/write head to data electronics. These electrical leads can be relatively delicate, and it can be difficult to alter the profile of the load beam without adversely affecting the delicate electrical leads.

Another method of correcting erroneous static attitude of the head slider involves directly adjusting a gimbal region of the flexure. For example, with regard to the gimbal region described above, the attitude of the resilient lateral arms supporting the tongue or the tongue itself could be adjusted to correct the static attitude of the head slider mounted to the tongue.

Additionally, some methods of adjusting static attitude require the adjustment to take place prior to mounting the head suspension to an actuator arm or E-block. Variations in head slider static attitude, however, could occur during such mounting procedures, either through handling or affects of actuator arm attitude on head slider attitude. These variations could not be corrected using such methods.

SUMMARY OF THE INVENTION

The present invention is directed to a process for adjusting the static attitude of a head slider or head slider bond pad mounted to a head suspension. The process allows adjustment of head slider static attitude without significantly changing the profile of the load beam or handling the gimballing region of the flexure or electrical leads which may be mounted thereto. Further, it is possible to use the adjustment process either before or after the head suspension is mounted to an actuator arm or E-block.

The process includes providing a head suspension having a load beam with a mounting region, a spring region and a rigid region. The head suspension also includes a flexure attached to the rigid region of the load beam. The flexure is for supporting a head slider having a read/write head. At least one attachment isolation structure is formed in the load beam. The attachment isolation structure includes an attachment area where at least a portion of the flexure is attached to the load beam, and at least one slot delineating the attachment area from the remainder of the load beam. The attachment isolation structure also includes at least one junction tab traversing the slot and connecting the attachment area to the remainder of the load beam. The flexure is attached to the load beam at at least the attachment area of the attachment isolation structure. The junction tab (or tabs) of the attachment isolation structure are permanently deformed, causing a displacement, preferably in a pitch or roll direction, of the attachment area. This displacement places a torque on the flexure which causes a displacement or adjustment of the static attitude of the head slider. In this way, by permanently deforming the junction tabs in a controlled manner the static attitude of the head slider can be adjusted.

Any number of junction tabs are contemplated to be used with the present invention. Further, the shape of the attachment area can be round, square, triangular or other shape. The junction tabs can be permanently deformed either by expanding them, contracting them or twisting them. The permanent deformations can be made to a single junction tab or more than one junction tab.

In accordance with the present invention, the permanent deformation of the junction tabs can preferably be achieved by application of pressure to the junction tabs or by the use of a laser beam thereon. Applying pressure to the junction tabs causes plastic, and therefore permanent, deformation thereof Use of a laser beam focused on a junction tab causes the contraction or expansion of one or both sides of the junction tab to permanently deform the junction tab. Use of a laser beam advantageously requires relatively little physical contact with the assembled head suspension.

BRIEF DESCRIPTION OF THE DRAWINGS

FIG. 8 is a partial top view of an alternate embodiment of a head suspension in accordance with the present invention illustrating an attachment isolation structure having only two junction tabs.

FIG. 9 is a partial top view of another alternate embodiment of a head suspension in accordance with the present invention illustrating an attachment isolation structure having only one junction tab.

FIG. 10 is a partial top view of an another alternate embodiment of a head suspension in accordance with the present invention illustrating an attachment isolation structure having two spiraled junction tabs.

FIG. 11 is a partial top view of an another alternate embodiment of a head suspension in accordance with the present invention illustrating a first attachment isolation structure nested within a second attachment isolation structure.

DETAILED DESCRIPTION OF THE PREFERRED EMBODIMENTS

Figure 1:
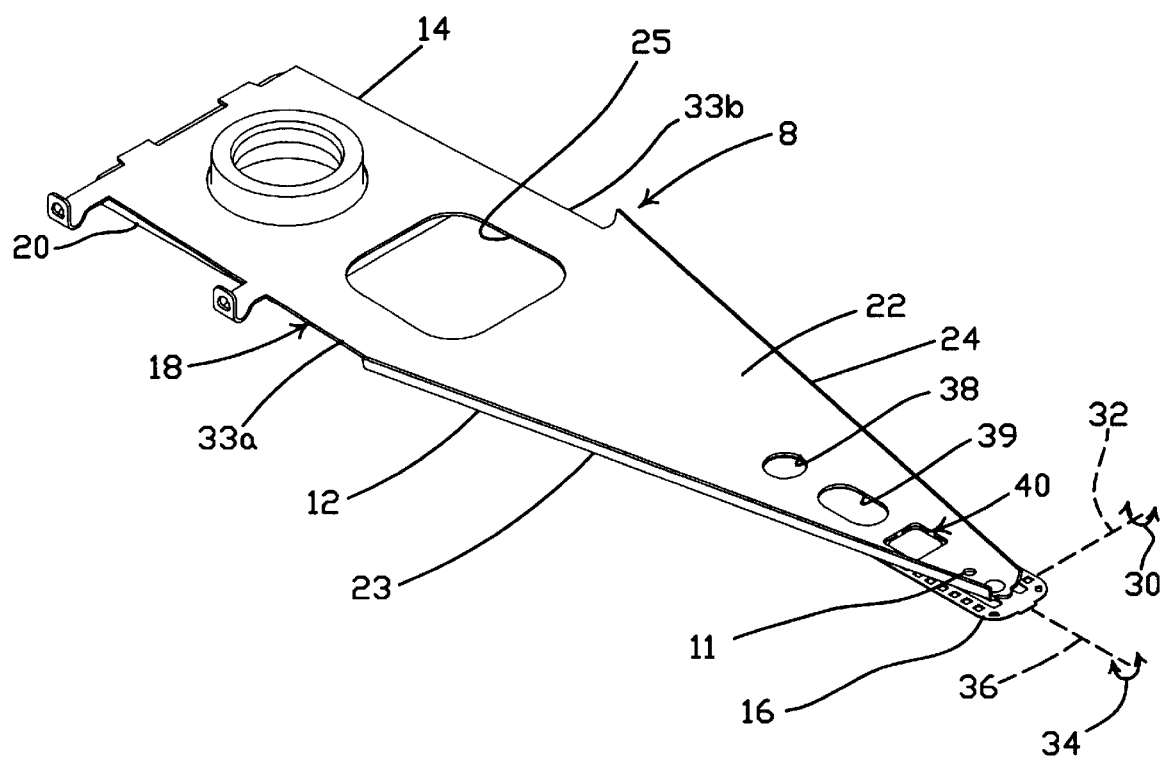
FIG. 1 is an isometric view of a head suspension including a flexure for supporting a head slider wherein the flexure is mounted to the load beam partially via an attachment isolation structure in accordance with the present invention.

With reference initially to FIG. 1, a head suspension 8 is illustrated in a isometric view and includes a load beam 12 having a separately formed flexure 16 mounted thereto. Load beam 12 includes a base or mounting region 14 on a proximal end, a relatively rigid region 22 adjacent to a distal end, and a radius or spring region 18 between the mounting region 14 and rigid region 22. Flexure 16, discussed more fully below, is mounted at the distal end of load beam 12 for providing a resilient connection between the load beam and head slider 9 (shown in FIG. 2).

A base plate 20 is mounted to mounting region 14 for attaching the suspension 8 to a disk drive actuator arm (not shown). The rigid region 22 has first and second lateral edges 23 and 24, respectively, at transversely spaced, opposite sides which converge towards the distal tip of head suspension 8. As shown, lateral edges 23 and 24 can be extended perpendicularly from the surface of load beam 12 to form rails to enhance stiffening. Preferably, spring region 18 has an aperture 25 located in the center thereof to control the spring force of load beam 12. Aperture 25 forms a first radius arm 33a on one side thereof and second radius arm 33b on the opposite side thereof. Alignment apertures 38 and 39 are preferably provided for alignment of flexure 16 with load beam 12 when mounting flexure 16 to load beam 12. Load beam 12 can be fabricated and formed from a sheet of stainless steel or other resilient material in a conventional manner.

Figure 2:
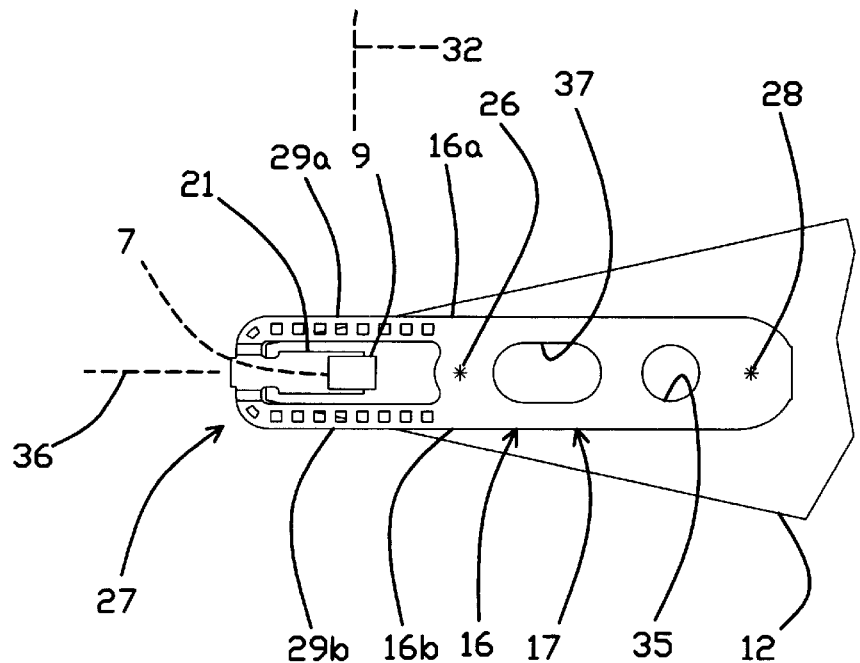
FIG. 2 is a bottom view of the head suspension shown in FIG. 1 including a head slider.

The spring region 18 of the load beam 12 includes a preformed bend or radius. This radius provides the spring force or load and thus a desired gram load, through flexure 16, to a head slider 9, for a predetermined offset height. Head slider 9 is shown in FIG. 2 which is a bottom view of head suspension 8. The offset height is a measurement of the distance between the mounting height of the head suspension to the actuator arm and the head slider 9 in a loaded state at fly height.

As shown from a bottom view in FIG. 2, a resilient connection is provided between the head slider 9 and the distal end of the load beam 12 by a flexure 16 located at the distal end of the load beam. Flexure 16 permits head slider 9 to move in a pitch direction, that is, in a rotational direction 30, shown in FIG. 1, about pitch axis 32. Flexure 16 also allows head slider 9 to move in a roll direction, that is, in a rotational direction 34 about roll axis 36, shown in FIG. 1. In this way slider 9 can be positioned to compensate for fluctuations of a spinning disk surface above which it flies. To allow movement of head slider 9 in pitch and roll directions, flexure 16 includes a gimbal region 27 which provides a gimbal connection between head slider 9 and load beam 12. Many different configurations for gimbal region 27 are known and contemplated to be used with the present invention. In the embodiment shown in FIG. 2, gimbal region 27 includes tongue 21 supported between resilient lateral arms 29a and 29b. The resiliency of lateral arms 29a and 29b allow head slider 9 to move in pitch and roll directions. The spring force of load beam 12 can be transferred to tongue 21 via load dimple 11, which can be a protrusion extending from load beam 12 in the direction of flexure 16. The resiliency of lateral arms 29a and 29b hold tongue 21 against load dimple 11. A slider bond pad 7, shown in FIG. 2, is located on tongue 21 of flexure 16. The slider bond pad 7 is the area to which the head slider 9 is mounted, preferably via adhesive but other methods can also be used. The dimple may alternately extend from slider bond pad 7.

Flexure 16 also includes a flexure mounting region 17 proximal to gimbal region 27 for mounting flexure 16 to load beam 12. In the embodiment shown in FIG. 2, flexure mounting region 17 preferably includes alignment apertures 35 and 37 for alignment with apertures 38 and 39, respectively, of load beam 12 when mounting flexure 16 to load beam 12 at at least one point.

Flexure 16 is typically attached to load beam 12 by way of a plurality of spot welds, though the attachments can also be made with adhesive or other known means. A first attachment point 26 and a second attachment point 28 are illustrated in FIG. 2. It is also within the scope of the present invention, however, for flexure 16 to be attached to load beam 12 at more than two points.

At first point 26, the surface of flexure mounting region 17 is welded or otherwise adhered to an attachment isolation structure 40. Attachment of flexure 16 to load beam 12 via attachment isolation structure 40 acts to isolate effects of attachment procedures from the load beam. For example, deformations of the area around the attachment point due to heat from formation of the weld. The function, manufacture, and variations of attachment isolation structures such as attachment isolation structure 40, are fully disclosed in co-pending U.S. patent application Ser. No. 08/821,709 filed Mar. 19, 1997, for "Welding Stress Isolation Structures for Head Suspension Assemblies", which is commonly owned by the assignee of the present application, and which is hereby incorporated by reference in its entirety.

At second point 28, the planar surface of flexure mounting region 17 is adhered by weld, solder or other method to the planar surface of the rigid region of load beam 12. It is also contemplated, however, that point 26 be attached without isolation structure 40 and point 28 include an isolation structure such as isolation structure 40, or that both points 26 and 28 are attached using isolation structures such as isolation structure 40.

Figure 3:
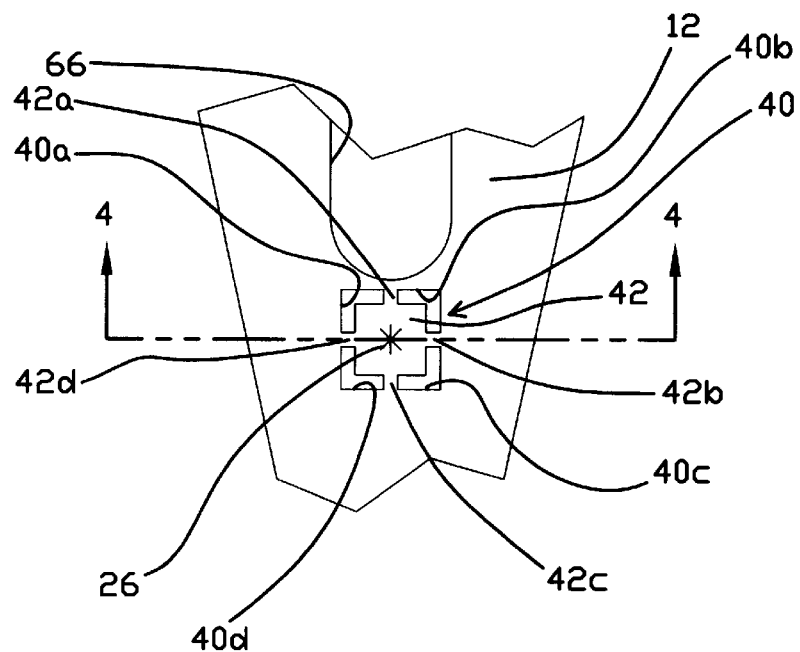
FIG. 3 is a partial top view of the head suspension shown in FIG. 1.

In the embodiment of FIG. 3, which is a partial top view of head suspension 8, attachment isolation structure 40 includes an attachment area 42; four isolation slots 40a, 40b, 40c, and 40d; and four junction tabs 42a, 42b, 42c and 42d. In the embodiment shown in FIGS. 1 and 3 attachment area 42 is a substantially square, planar region formed within the rigid region 22 of load beam 12. The attachment at attachment point 28 (whether it be by weld, solder, adhesive or other method) between flexure 16 and load beam 12 is made to a bottom face of attachment area 42. Preferably, attachment point 28 is near the center of attachment area 42, but need not be. Isolation slots 40a–40d preferably pass entirely through the thickness of load beam 12, delineate the perimeter of attachment area 42, and act to functionally separate or isolate it from the remainder of rigid region 22. It is also contemplated, however, that isolation slots 40a–40d pass only part of the way through the thickness of load beam 12 and as such can be, for example, partially etched in a known manner. Junction tabs 42a–42d are deformable arms which serve to connect attachment area 40 to the remainder of rigid region 22. It may also be desirable to partially etch junction tabs 42a–42d. As such, if both isolation slots 40a–40d and junction tabs 42a–42d are partially etched, slots 40a–40d and junction tabs 42a–42d may become indistinguishable from one another. In such an instance, it is considered that attachment area 42 be delineated by and connected to the remainder of the load beam by a partially etched trough surrounding attachment area 42.

Figure 4:
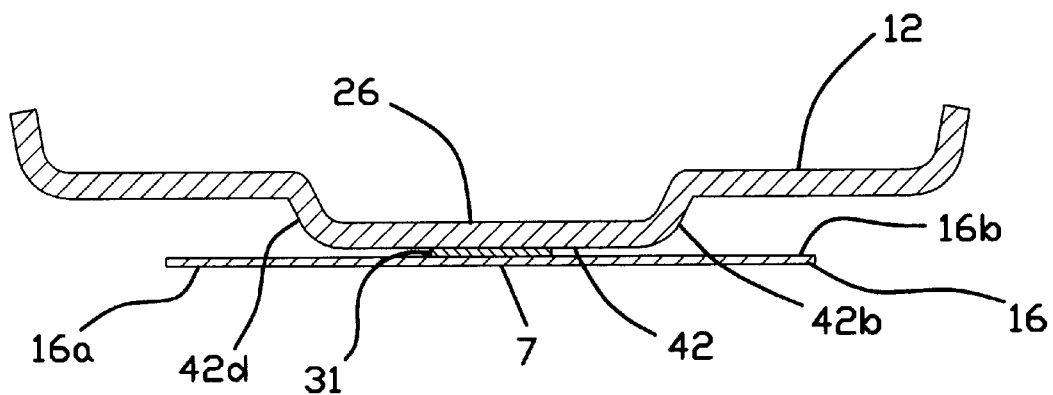
FIG. 4 is a sectional view of the head slider shown in FIG. 1 taken along line 4—4 of FIG. 3.

Further, in the embodiment of FIG. 3 and as shown in FIG. 4, which is a sectional view of load beam 12 taken along line 4—4 of FIG. 3, junction tabs 42a–42d are formed to provide an offset from rigid region 22 out of the plane of the remainder of rigid region 22 and at an angle toward flexure 16. Such an offset can be formed in any conventional manner. In this way, for reasons which will be explained below, junction tabs 42a–42d can support attachment area 42 substantially parallel to the plane of the remainder of rigid region 22 but shifted out of this plane toward flexure 16. It is noted that attachment area 42 may instead be supported by junction tabs 42a–42d to be co-planar with the remainder of rigid region 22.

Additionally, in the embodiment shown in FIG. 3, attachment area 42, junction tabs 42a–42d, and rigid region 22 of load beam 12 are unitary with each other and formed from the same resilient material, preferably stainless steel. However, it is also contemplated to form either attachment area 42 or junction tabs 42a–42d separately and/or from a different deformable material or different thickness of the same deformable material from which load beam 12 is formed, and mount attachment area 42 and/or junction tabs 42a–42d to load beam 12.

Figure 5:
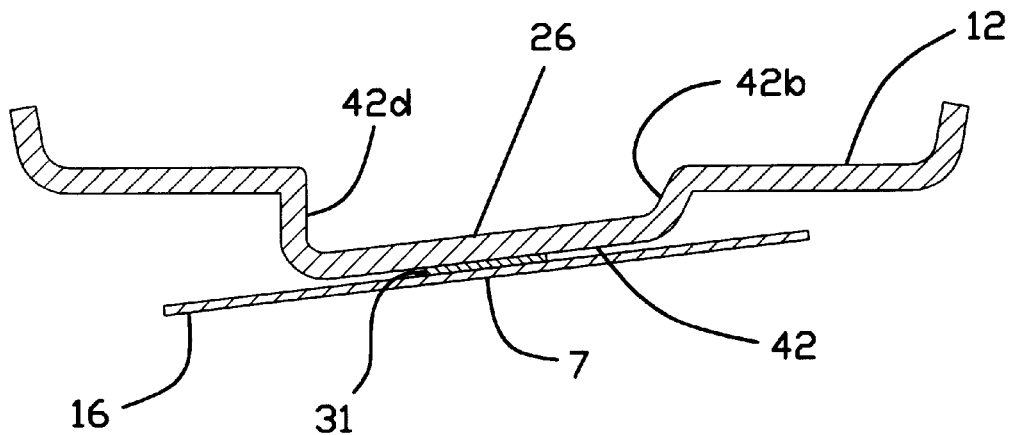
FIG. 5 is an alternate sectional view of the head suspension shown in FIG. 1 taken along line 4—4 of FIG. 3 illustrating a roll displacement of the flexure.

Because junction tabs 42a–42d are deformable, they can permit attachment area 42 to shift at an angle to the plane of the remainder of rigid region 22. Specifically, junction tabs 42a–42d can permit attachment area 42 to move in the pitch and roll directions relative to load beam 12. As shown in FIG. 5, which shows a modified view of head suspension 8 taken along line 4—4 of FIG. 3, if junction tab 42b is oriented at a greater angle to the plane of rigid region 22 than shown in FIG. 4 and junction tab 42d is bent at less of angle to rigid region 22 than shown in FIG. 4, attachment area 42 will move in the roll direction. It should be noted that in order for junction tabs 42b and 42d to be re-oriented in this way, junction tabs 42a and 42c will have to undergo a slight twisting deformation. As noted above, because junction tabs 42a–42d are formed from a deformable material, junction tabs 42a and 42c will be able to undergo this twisting deformation.

An attachment 31 at attachment point 26 is shown in FIGS. 4 and 5. As noted above, attachment 31 can be any type of suitable attachment but is preferably a spot weld. Attachment 31 can be substantially rigid. Further, like load beam 12, flexure 16 can be formed from a substantially resilient material such as stainless steel. In this way, if attachment area 42 is re-oriented about its pitch and/or roll directions, a torque will be applied through attachment 31 tending to rotate in the pitch and/or roll direction the surface of the mounting region 17 of flexure 16 attached to attachment area 42 by attachment 31. Accordingly, a permanent deformation of junction tabs 42a–42d, such as shown in FIG. 5, will cause the portion of mounting region 17 of flexure 16 attached to attachment area 42 to re-orient in the roll direction along with attachment area 42. A "permanent deformation" as used herein, is one in which the junction tab is deformed and will hold its shape in the deformed position, but can be de-formed into another shape or formed back into its original shape. Also, junction tabs 42a and 42c could be permanently deformed to re-orient a portion of the mounting region 17 of flexure 16 in the pitch direction. A superposition of the deformation of junction tabs 42b and 42d shown in FIG. 5 and substantially the same deformation of junction tabs 42a and 42c, would cause a movement of a portion of mounting region 17 of flexure 16 in both the pitch and roll directions.

Figure 6:
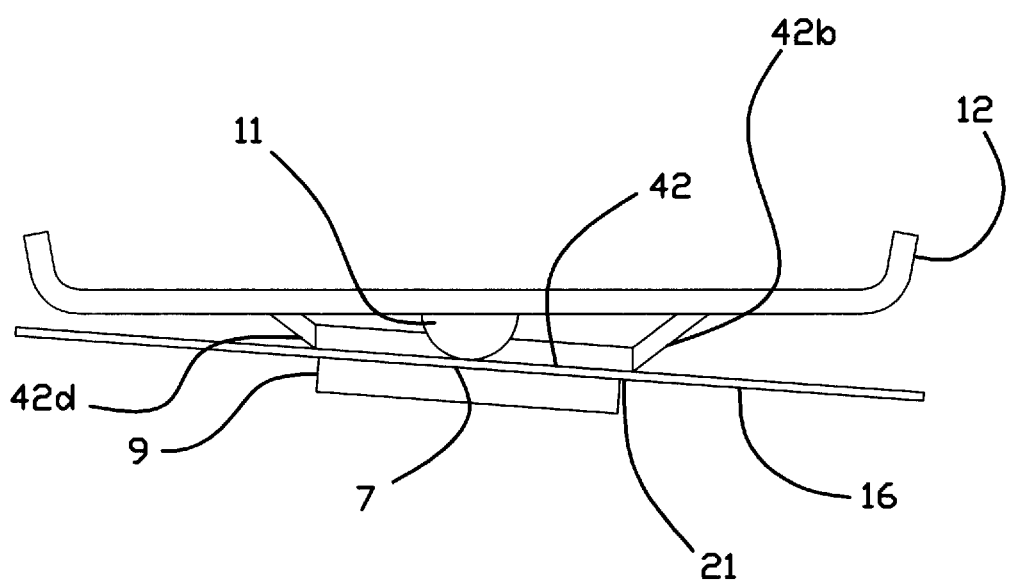
FIG. 6 is a front view of the head suspension shown in FIG. 1 illustrating a roll displacement of the head slider.
Figure 7:
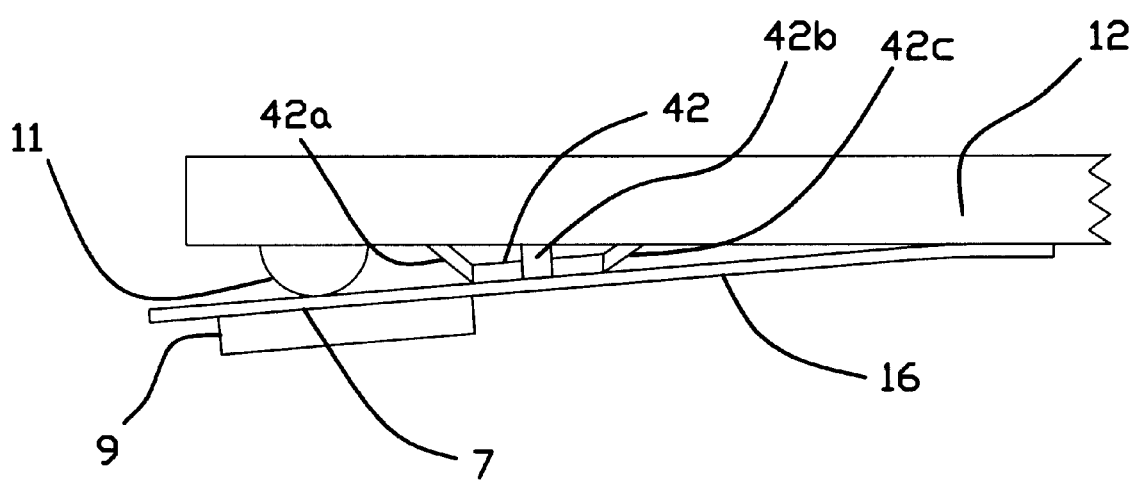
FIG. 7 is a side view of the head suspension shown in FIG. 1 illustrating a pitch displacement of the head slider.

As shown in FIG. 2, lateral arm 29a of flexure 16 is attached to flexure mounting region 17 along edge 16a of flexure 16. Similarly, lateral arm 29b is attached to flexure mounting region 17 along edge 16b of flexure 16. As such, a re-orientation in the roll direction of the portion of mounting region 17 attached to attachment area 42 will place roll torque on mounting region 17 causing lateral arms 29a and 29b to re-orient relative to each other. As shown in FIG. 6, which is an exaggerated front view of head suspension 8 and head slider 9, this re-orientation will be transferred to tongue 21 and, ultimately, head slider bond pad 7 and head slider 9. In the substantially the same way, as shown in FIG. 7 which is an exaggerated side view of head suspension 8 including head slider 9, a reorientation in the pitch direction of the portion of mounting region 17 attached to attachment area 42 will be transmitted to head slider bond pad 7 and head slider 9 through lateral arms 29a and 29b and tongue 21. It is contemplated that this same type of transmission of a displacement in the pitch and/or roll directions of attachment area 42 ultimately to head slider 9 can take place in any other type of gimbal design.

It is to be understood that it is also within the ambit of the present invention to alter the height of attachment area 42 with respect to the remainder of the rigid region 22 without re-orienting attachment area 42 in either the pitch or roll directions. Such a change in height is then transferred, through flexure mounting region 17, to head slider 9, changing the fly height thereof.

This transmission of a pitch and/or roll displacement of attachment area 42 to head slider 9 through pitch and/or roll torque applied to flexure mounting region 17 allows correction of static attitude of slider bond pad 7 and, thus, head slider 9. That is, by permanently deforming junction tabs 42a–42d to generate a displacement in the pitch and/or roll directions of attachment area 42, deviations from desired static attitude of head slider 9 can be corrected. Adjusting static attitude of head slider 9 by permanently deforming any or all of junction tabs 42a–42d on attachment isolation structure 40 advantageously does not require altering the loaded profile of load beam 12 as viewed along either lateral edge 23 or lateral edge 24.

Further, while deforming junction tabs 42a–42d deforms flexure 16, the deformation of flexure 16 can be relatively slight. Also, the deformation of flexure 16 is distributed throughout the relatively large mounting portion of flexure 16. That is, no relatively small "spot" of flexure 16 is severely deformed. Accordingly, it is most likely that the deformation experienced by flexure 16 when junction tabs 42a–42d are deformed, will be an elastic deformation, rather than permanent. As such, the shape of flexure 16 is advantageously not permanently altered.

Additionally, flexure electrical leads which may be routed over lateral arms 29a and 29b of flexure 16 can be advantageously remain substantially un-affected. Also, electrical leads on a load beam would not typically be attached to an attachment isolation structure thereon because the stiffness of the leads would reduce the ability of the attachment isolation structure to deform. This, combined with the fact that the profile of the load beam does not need to be altered, means that electrical leads on the load beam can also remain substantially un-affected.

It is to be understood that designs of attachment isolation structures other than that shown in FIG. 3 are also within the scope of the present invention. For example, FIG. 8 is a partial top view of a load beam 112 including an attachment isolation structure 140 which is round and has only two junction tabs 142a and 142b connecting attachment area 142 to load beam 112. Further, FIG. 9 is a partial top view a load beam 212 including a round attachment isolation structure 240 having only a single junction tab 242a connecting attachment area 242 to load beam 212. Attachment isolation structures having three and more than four junction tabs are also considered. Also, the attachment area of the attachment isolation structure need not be square or circular, it can be any other shape such as, for example, triangular, pentagonal or "star" shaped. Additionally, the junction tabs do not need to be substantially rectangular or square members. For example, FIG. 10 is a partial top view of a load beam 312 including attachment isolation structure 340 having two junction tabs 342a and 342b which spiral from their respective connection points with load beam 312 to their respective connection points with attachment area 342. It is also considered to form a "nested" attachment isolation structure as shown in FIG. 11. FIG. 11 is a partial top view of a load beam 412 including a first attachment isolation structure 440a having junction tabs 442a and 442b supported within a second isolation structure 440b having junction tabs 442c and 442d. The precise design of the attachment isolation structure used with a specific head suspension will vary with the design of the head suspension. All that is necessary is that the attachment area of an attachment isolation structure be connected to the remainder of a load beam such that the orientation of the attachment area can be altered to enable the adjustment of the static attitude of a head slider or head slider bond pad attached to a flexure.

Moreover, it is also contemplated to attach flexure 16 to load beam 12 at more than two attachment points. And, it is also within the scope of the present invention to form more than one attachment isolation structure in the load beam to which flexure 16 can be attached. However, due to simplicity in manufacturing and assembly, one attachment isolation structure is preferred.

Any type of permanent deformation of junction tabs connecting an attachment area to a load beam can be used with the present invention. For example any given junction tab may be compressed or stretched, bringing the attachment area closer to, or further from, respectively, the portion of the load beam to which the compressed junction tab is attached. A junction tab may also be bent or twisted. Which deformation is used is dependent upon a number of factors including: how many junction tabs are used with the specific attachment isolation structure; how the junction tabs are spaced around the attachment area (e.g. opposing each other or spaced at 90 degree intervals or other intervals); how the junction tabs are formed (e.g. spiral, rectangular); how the junction tabs are oriented with the load beam (e.g. along the pitch axis, along the roll axis, or having components along both the pitch and the roll axis), and the specific adjustment in static attitude of the head slider which is desired (e.g. in the pitch direction, roll direction, or a superposition of both).

Head suspension 8 can be formed from any resilient material and is preferably formed from stainless steel. Blanks having the dimensions of load beam 12 can be cut or otherwise formed from a sheet of stainless steel. A blank can be chemically etched or otherwise cut to form apertures 25, 38 and 39 and isolation slots 40a–40d. If it is found that resulting junction tabs 42a–42d are too resilient to be appropriately deformed, it is contemplated to partially etch, using known methods, portions of junction tabs 42a–42d to reduce their resiliency. Also, if it is found that junction tabs 42a–42d are not resilient enough, isolation slots 40a–40d can be partially etched in load beam 12 or wider junction tabs can be provided. Further, the radius of spring region 18 can be formed using known methods.

To fabricate flexure 16, blanks having the dimensions of flexure 16 can be cut or otherwise formed from a sheet of stainless steel. Alignment apertures 35 and 37, tongue 21 and arms 29a and 29b can then be chemically etched or otherwise cut from the blanks. Flexure 16 can be mounted to load beam 12 at attachment points 26 and 28 by welding, soldering adhesive or other process. Head slider 9 can then be mounted to tongue 21 at slider bond pad 7 by welding, soldering, adhesive, or other process.

Any method to permanently deform junction tabs connecting an attachment area to a load beam to place a pitch or roll torque on mounting region 17 of flexure 16 to adjust the static attitude of head slider 9 is contemplated to be used with the present invention. Two specific methods, however, are discussed below. A first method involves mechanically deforming junction tabs 42a–42d. To accomplish this, the load beam is supported by a fixture. Such fixtures are known in the art and one specific such fixture is disclosed below. Such a fixture is also disclosed in U.S. Pat. No. 5,682,780, issued Nov. 4, 1997 to Girard for "Gram Load, Static Attitude And Radius Geometry Adjusting System For Magnetic Head Suspensions", commonly owned by the assignee of the present application, and the which is hereby incorporated by reference in its entirety.

Figure 12:
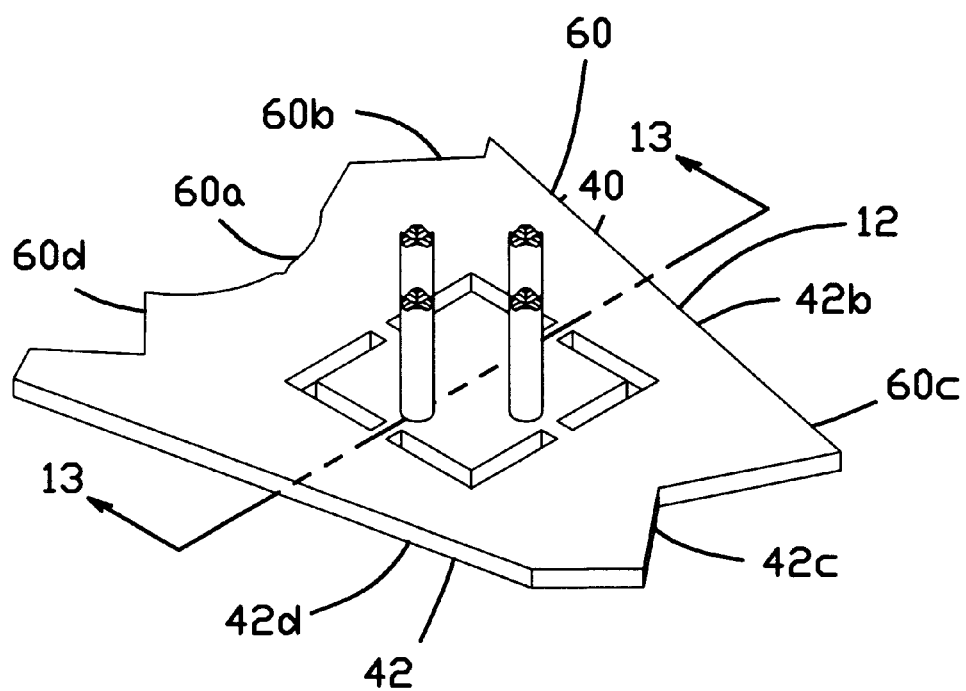
FIG. 12 a partial schematic view of the head suspension shown in FIG. 1 illustrating an adjusting structure having deforming pins.

Once load beam 12 is supported by a fixture, as shown schematically in FIG. 12, an adjusting structure 60 is placed against the upper surface of attachment area 42. In the embodiment shown in FIG. 12, adjusting structure 60 includes 4 deformation pins 60a, 60b, 60c and 60d. Deformation pins 60a–60d can contact attachment area 42 such that they are evenly spaced about the perimeter of attachment area 42. In the embodiment of FIG. 12, each deformation pin 60a, 60b, 60c and 60d is placed adjacent to junction tabs 40a, 40b, 40c and 40d, respectfully. However, this configuration is not required. For example, deformation pins 60a–60d could contact attachment area 42 at circumferential points between junction tabs 42a–42d or could contact deformation tabs 42a–42d directly without contacting attachment area 42.

Figure 13:
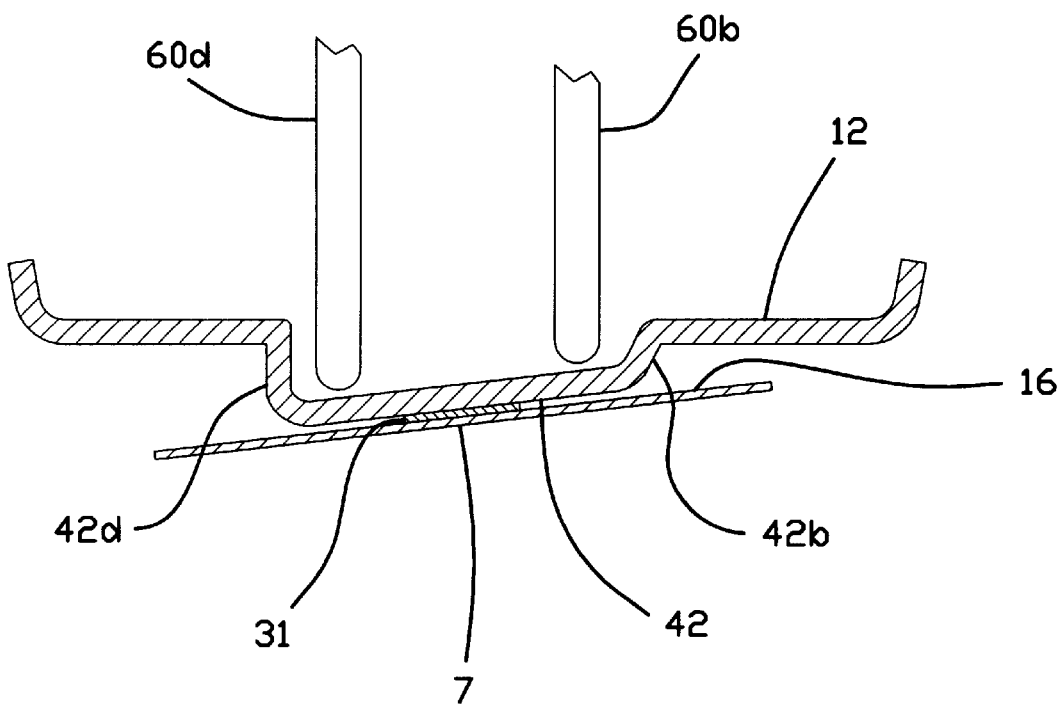
FIG. 13 is a sectional view of the head suspension shown in FIG. 1 and adjusting structure shown in FIG. 12 taken along section line 13—13 of FIG. 12.

As shown in FIG. 13, which is a sectional view of load beam 12 taken along section line 13—13 of FIG. 12, force is exerted on adjusting structure 60 and translated to one or more of deformation pins 60a–60d to cause attachment area 42 to re-orient. Force can be exerted on deformation pins 60a–60d by machine or manually. A method and machine for exerting force on deformation pins 60a–60d is disclosed in U.S. Pat. No. 5,682,780, the disclosure of which has been incorporated by reference. It is to be understood that adjusting structure 60 can have fewer or greater than 4 deformation pins 60a–60d. Other configurations for adjusting structure 60 are also considered. For example deformation pins 60a–60d are not necessary, the adjusting structure can be in the form of a shaft having an annulus which contacts attachment area 42 about its entire perimeter. It is only necessary that adjusting structure 60 be able to adjust attachment area 42.

By re-orienting attachment area 42 in pitch and/or roll directions, permanent deformation of junction tabs 42a–42d by twisting, bending, expanding, or other deformation, will occur as necessary to allow attachment area 42 to re-orient. As explained above, such deformation ofjunction tabs 42a–42d and re-orientation of attachment area 42 acts to adjust the static attitude of head slider bond pad 7 and, thus, head slider 9.

To achieve a desired static attitude of head slider 9, the starting static attitude of head slider 9 can be measured. Methods for measuring static attitude of head sliders are known. Static attitude of a head slider can be measured directly from the head slider while it is mounted to the slider bond pad. It is to be understood, however, that static attitude can also be measured from the slider bond pad without the head slider being attached thereto. Thus, static attitude can be measured either before or after head slider 9 has been attached to slider bond pad 7 of head suspension 8. Further, static attitude is typically measured with the head suspension in a "loaded" state, that is, while the head suspension is either under the influence of the upward force of an air bearing generated by a spinning disk or in a situation wherein this force is simulated by lifting the slider to its loaded position.

If the starting static attitude of head slider 9 has pitch and/or roll errors, the attitude of attachment area 42 can then be adjusted using the above described method. The adjustment should be made in a direction to compensate for the pitch and/or roll errors discovered in the measurement of the starting static attitude. For example, if the starting static attitude shows roll error in a clockwise direction (as would be viewed along section line 13—13 of FIG. 12), then, as shown in FIG. 13, downward displacement of deformation pin 60d can be made greater than the downward displacement of deformation pin 60b. This will cause attachment area 42 to move in a counterclockwise roll direction. Because junction tabs 42a–42d will permanently deform to allow attachment area 42 to remain rotated in the counterclockwise roll direction, attachment area 42 will place a counterclockwise roll torque on flexure 16. As discussed above, this roll torque will cause head slider 9 to move in the counterclockwise roll direction, thereby compensating for the clockwise roll error in its static attitude. The static attitude of head slider 9 can then be remeasured. If errors still exist, then the above process can be repeated until any error has been corrected. It is also contemplated to measure the static attitude of head slider 9 while simultaneously using adjusting structure 60 to move attachment area 42.

The precise amount of movement of attachment area 42 by deformation pins 60a–60d to produce a given change in static attitude of head slider 9 is dependent upon the type, thickness, and resiliency, among other factors, of the material used to form junction tabs 42a–42d. If junction pads 42a–42d are relatively resilient, it may be necessary to "overshoot" an adjustment, that is, move attachment pad 42 farther in a compensating direction than its needs to remain to effect the correct static attitude compensation. After overshooting, attachment area 42 may then come to rest at the correct position. The amount of force deformation pins 60a–60d need to apply to attachment area 42 to make an accurate static attitude adjustment, and whether or not overshooting is necessary, can be determined empirically. Over time, data collected from error correction and deformation results can be utilized to estimate a desired overshoot for the correct results. The above described method of adjusting static attitude of a head slider 9 is contemplated to be used with any configuration of attachment isolation structure discussed above.

Figure 14:
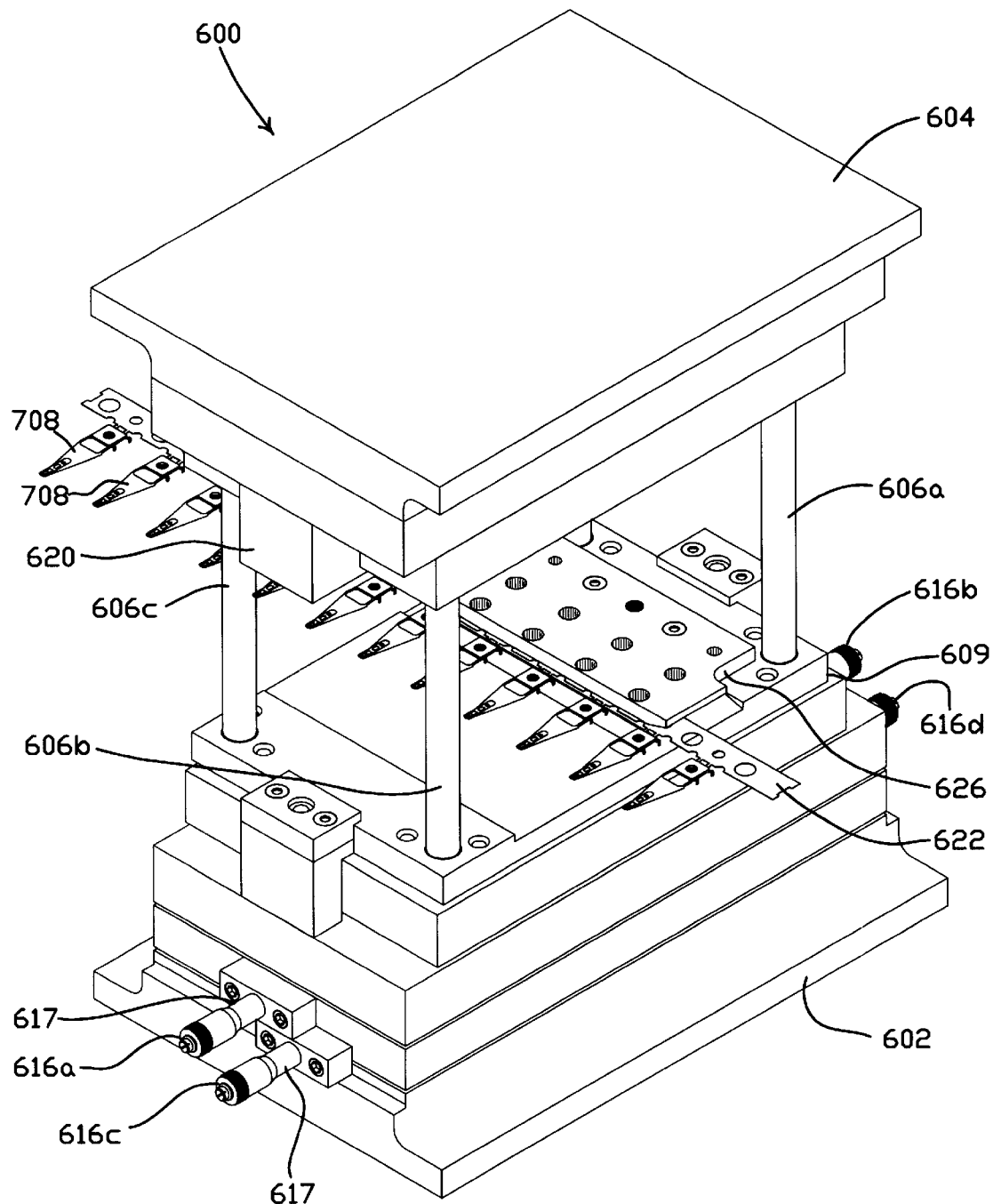
FIG. 14 is an isometric view of a machine which can be used to adjust the static attitude of a head slider or slider bond pad in accordance with the present invention.

A specific device for implementing the above described method of mechanically adjusting the static attitude of a head slider is shown in an isometric view in FIG. 14. FIG. 14 shows a machine 600 which includes a base 602, a top press 604 supported over the base 602 by four support guides 606a, 606b, 606c and 606d, and a work surface 609 supported by the base 602 beneath the top press 604. Base 602 also preferably includes micrometer adjustment sleeves 616a, 616b, 616c, and 616d, for use, as described below, in adjustment of the static attitude of a head slider bond pad or head slider. Micrometer adjustment sleeves 616a–616d are rotatably supported by respective micrometer stems 617 (only two shown).

Figure 16:
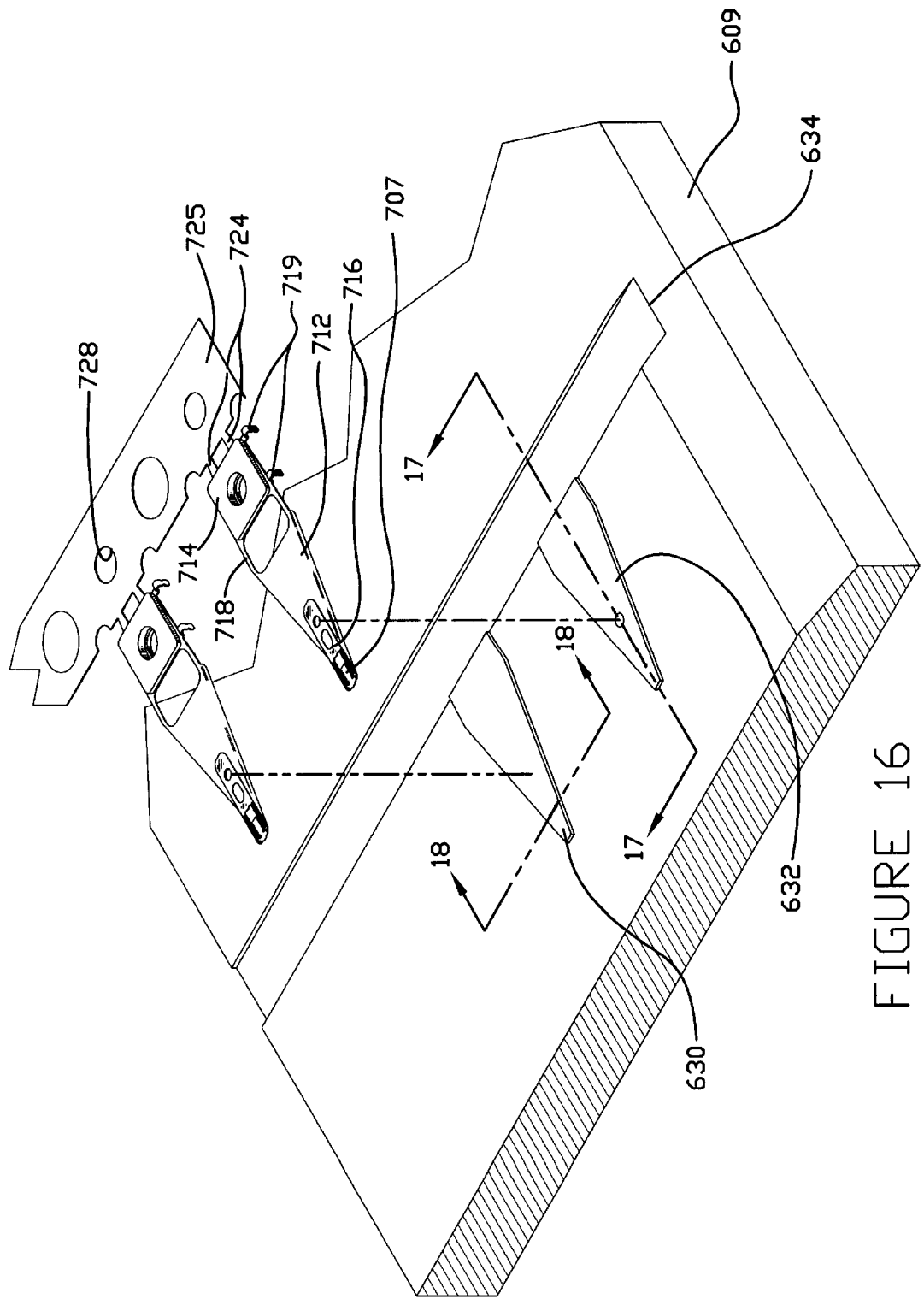
FIG. 16 is an enlarged view of the machine shown in FIG. 14 illustrating adjustment nests in accordance with the present invention.

A plurality of head suspensions 708 are processed by machine 600 after, as shown in FIG. 16, load beams 712 have been fabricated, the spring regions 718 have preferably been rolled or formed, and fully fabricated flexures 716 have been attached to the rigid regions 722 of load beams 712. Head suspensions 708 are substantially the same as head suspension 8 described above. Preferably, to facilitate manufacturing, each head suspension 708 can be attached to a processing strip 725 at the proximal end of each respective mounting region 714 by two tabs 724. Retaining plate 626 of machine 600 is attached to work surface 609 and is cantilevered over a conventional feed mechanism (not shown) in base 602. The feed mechanism engages indexing apertures 728 in processing strip 725, as known, to index head suspensions 708 through machine 600. Retaining plate 626 facilitates engagement of processing strip 725 including indexing apertures 728 with the feed mechanism.

Figure 15:
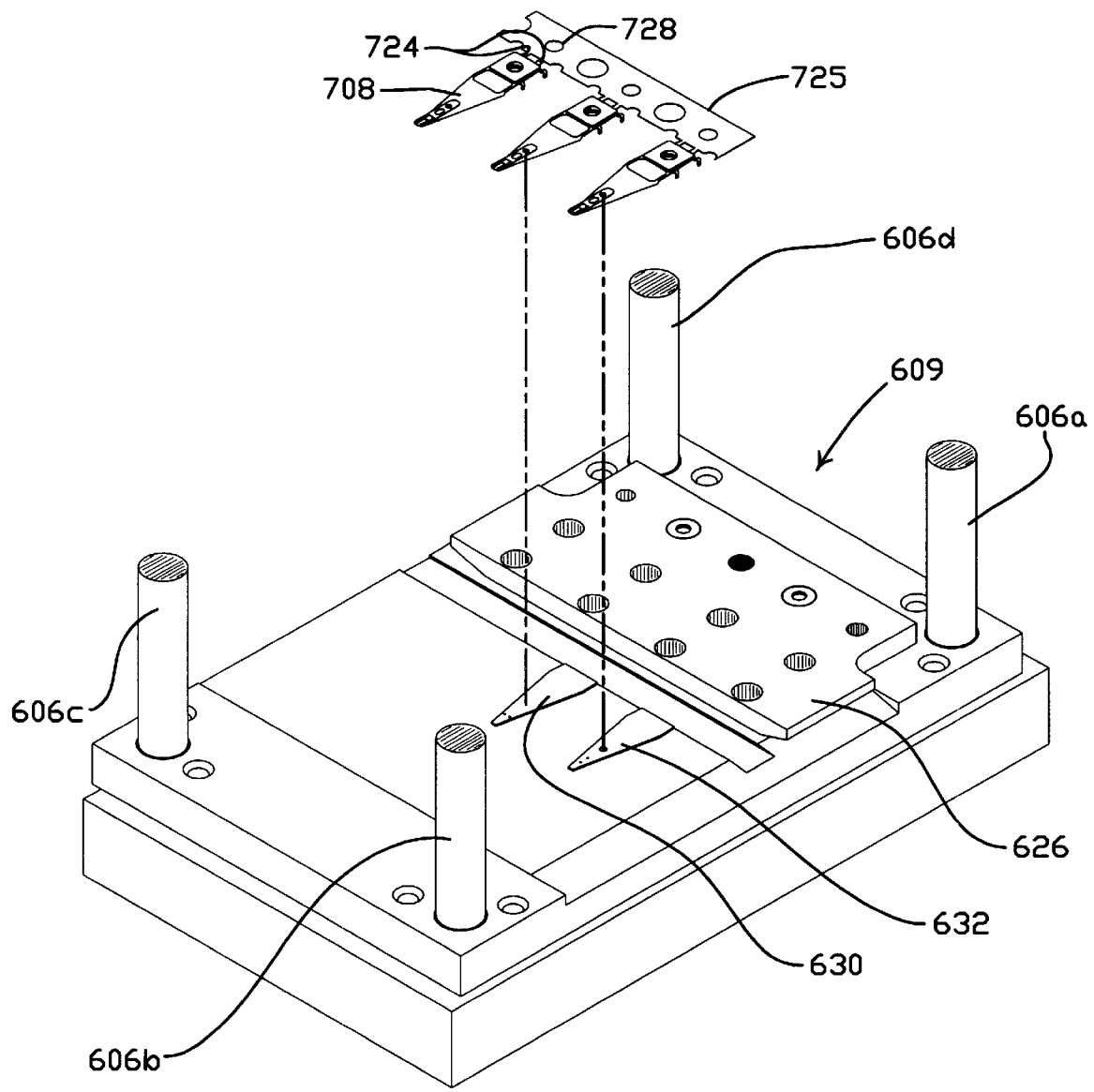
FIG. 15 is a partial isometric view of the machine shown in FIG. 14.

FIG. 15 is an isometric view of work surface 609. As shown, work surface 609 includes adjustment nests 630 and 632. In the embodiment shown in FIGS. 14–18, and as will be described below, adjustment nest 630 is for adjusting static attitude of a head slider (not shown) or a head slider bond pad 707, in the roll direction and adjustment nest 632 is for adjusting static attitude of a head slider or head slider bond pad 707, in the pitch direction. A trough 634 preferably extends between adjustment nests 630, 632 and retaining plate 626 to facilitate the transport of features, such as tabs 719, across machine 600 un-impeded. As shown in FIG. 16, adjustment nests 632 and 634 each include a raised surface having the general shape of a head suspension 708.

Figure 17:
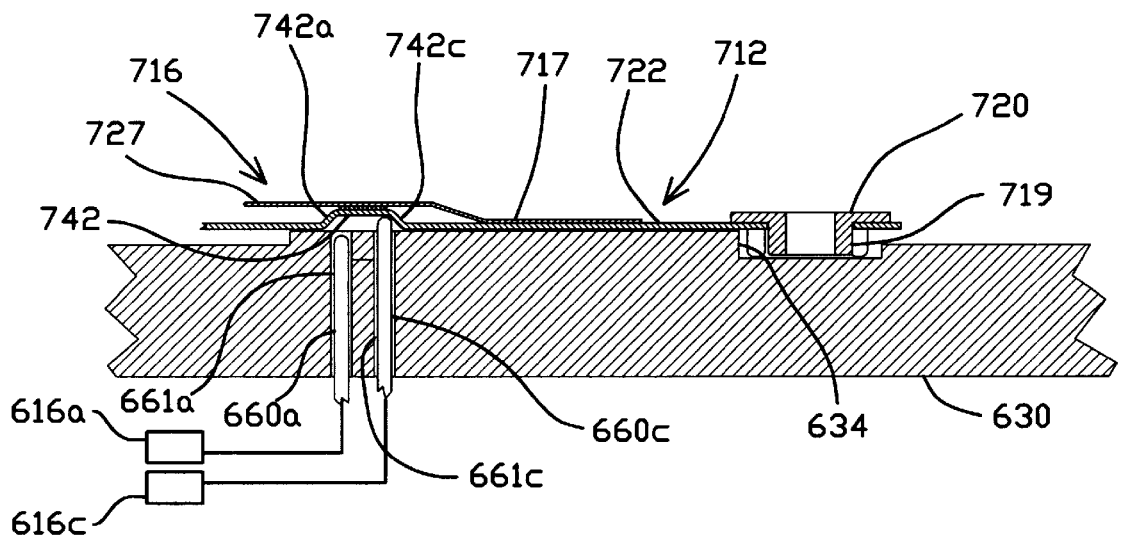
FIG. 17 is a sectional view of the machine shown in FIG. 14 taken along line 17—17 of FIG. 16.
Figure 18:
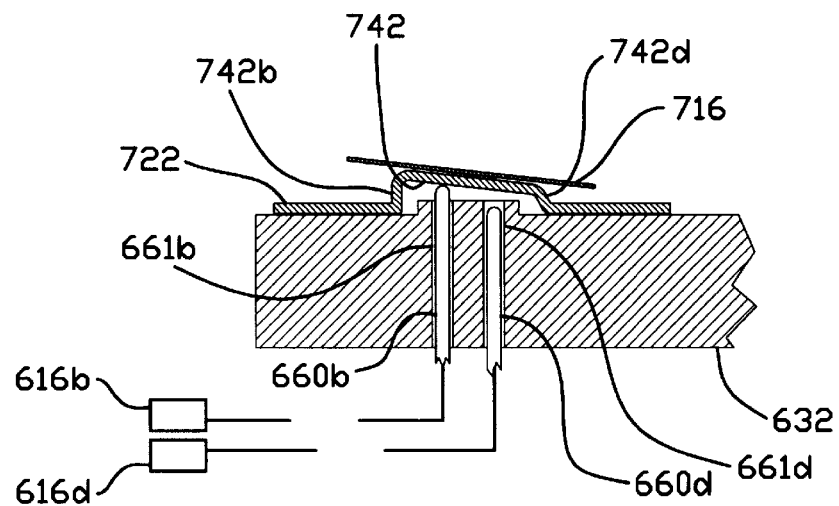
FIG. 18 is a sectional view of the machine shown in FIG. 14 taken along line 18—18 of FIG. 16.

As shown in FIG. 17, which is a sectional view of work surface 609 taken along line 17—17 of FIG. 16, adjustment nest 634 includes pin shafts 661a and 661c which carry deformation pins 660a and 660c, respectively. As shown in FIG. 18, which is a sectional view of work surface 608 taken along line 18—18 of FIG. 16, adjustment nest 632 includes pin shafts 661b and 661d which carry deformation pins 660b and 660d, respectively.

Micrometer sleeves 616a, 616b, 616c and 616d, shown in FIG. 14, are mechanically, electrically, pneumatically or otherwise linked, as known, to deformation pins 660a, 660b, 660c and 660d, respectively such that by rotating micrometer sleeves 616a–616d on respective micrometer stems 617, deformation pins 660a–660d are longitudinally shifted in shafts 661a–661d, respectively. Also, micrometer sleeves 616a–616d and respective micrometer stems 617 are demarcated such that an operator rotating a micrometer sleeve 616a–616d can view the demarcations and determine the direction (either towards head suspensions 8 or away) and linear distance deformation pins 660a–660d, respectively, have been shifted in shafts 661a–661d, respectively.

Accordingly, to adjust static attitude of head slider or a head slider bond pad 707 using machine 600, the static attitude of the head slider or head slider bond pad 707 is measured. In the embodiment shown in FIGS. 14–18, head sliders are not yet attached to head suspensions 8, as such, the static attitude of head slider bond pads 707 would be measured by a known means. This measurement is taken prior to the head suspension 708 on which the measurement has been made enters machine 600. Once entering machine 600, the specific head suspension 708, the static attitude of which is to be adjusted, is first indexed to adjustment nest 634 such that attachment isolation area 740 is positioned above deformation pins 660a and 660c, as shown in FIG. 17. Top press 604 (not shown in FIG. 17) is then lowered on support guides 606a–606d over head suspension 708 to firmly seat head suspension 708 against adjustment nest 634 during the static attitude adjustment.

Deformation pins 660a and 660c of nest adjustment 632 can be used to adjust the pitch static attitude of head slider bond pad 707. Accordingly, an operator, having noted any error in pitch static attitude during measurement thereof, can manipulate micrometer sleeves 616a and 616c to move deformation pins 660a and 660c an appropriate amount towards or away form attachment area 742 as described above to adjust the pitch static attitude of head slider bond pad 707. Top press 604 is then lifted off head suspension 708 which is then indexed, by operator control or otherwise, to adjustment nest 630 as shown in FIG. 18. The above described process can then be repeated with head suspension 708 at adjustment nest 630 with the exception that the operator manipulates micrometer adjustments sleeves 616b and 616d to adjust for any roll error in static attitude of head slider bond pad 707. It is also contemplated to adjust both pitch and roll static attitude at one adjustment nest. That is, deformation pins 660a–660d would be located at a single adjustment nest rather than two as shown. It is also contemplated that this adjustment process be automated, so that there is no need for operator adjustment.

Head suspension 708 can then be indexed out of machine 600 and the static attitude of head slider bond pad 707 re-measured. If the static attitude is acceptable, the process is complete. If the static attitude is unacceptable, then the process can be repeated by either the same machine 600 or a similar machine located further down a production assembly line. In the alternative, if the static attitude is unacceptable, head suspension 708 can be discarded. It is to be understood that while machine 600 can adjust the static attitude of head suspension 708 while it is still attached to processing strip 725, it is also contemplated to use the method of the present invention to adjust the static attitude of a head slider or head slider bond pad on a head suspension which is not attached to a processing strip such as processing strip 725.

A second method to permanently deform junction tabs connecting an attachment area to a load beam to place a pitch or roll torque on a flexure mounting region to adjust the static attitude of a head slider involves the formation of a deposition layer on at least one junction tab to deform the junction tab. As used herein, a "deposition layer" is any layer formed on the junction tab which does not remove any material from the junction tab and adheres a layer of additional substance over the junction tab by any method.

A deposition layer on a junction tab acts to warp the junction tab because of differences in coefficients of thermal expansion ("CTE") between the substance forming the deposition layer and the substance forming the junction tab. This difference in CTE between the junction tab and deposition layer essentially acts to expand or contract one or more portions of a selected junction tab with respect to the remainder of the junction tabs. The portion or portions expanded or contracted can be a flat surfaces, a portion of flat surface, a curved surface, or a portion of a curved surface.

Figures 19A, 19B:
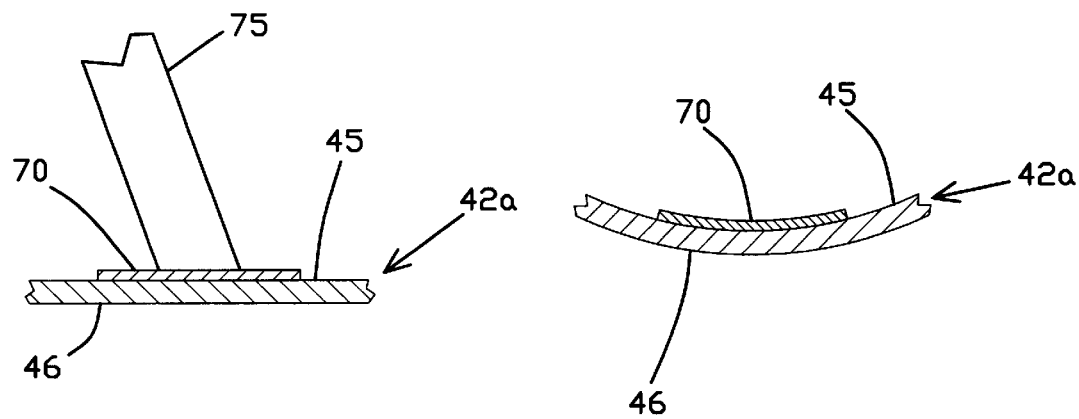
FIG. 19a is a partial sectional side view of the attachment isolation structure shown in FIG. 1 illustrating a junction tab thereof being exposed to a laser beam.
FIG. 19b is a partial sectional side view of the junction tab shown in FIG. 19a having a layer of oxide formed thereon to deform the junction tab in a first direction.

A specific method for forming a deposition layer on a junction tab involves using a laser to form a deposition layer over the portion or portions of the junction tab to be contracted with respect to an opposing surface. FIGS. 19a and 19b, which are side views of junction tab 42a, illustrate a method to bend a straight, substantially rectangular box, section of junction tab 42a by contracting a portion of one surface. Junction tab 42a can be heated with a laser beam 75 emanating from a laser (not shown) on one surface 45 thereof. When surface 45 reaches a critical temperature, a deposition layer 70 will form thereon. The deposition layer can be formed from any substance which will form a deposition layer when a substance is heated, such as oxide or nitride. The critical temperature and substance from which the deposition layer is formed is dependent upon a number of factors including the material from which junction tab 42a is formed and the atmosphere in which the deposition layer is formed. Formation of deposition layers on stainless steel when the surface of the stainless steel reach critical temperatures is well known.

If surface 45 is heated relatively quickly, as by a high powered laser, or surface 46 is cooled while surface 45 is heated, tab 42a will expand relatively little before deposition layer 70 forms. Then, as shown in FIG. 19b, as oxide layer 70 cools it will contract and bend junction tab 42a around it, thus deforming junction tab 42a.

Figure 19C:
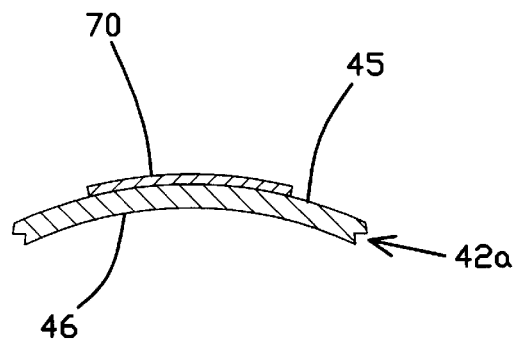
FIG. 19c is a partial sectional side view of the junction tab shown in FIG. 1 9a having a layer of oxide formed thereon to deform the junction tab in a second direction.

This method of forming a deposition layer on a junction tab to deform the junction tab can also be used to bend the junction tab in a direction away from the surface which is exposed to the laser beam. If surface 45 of junction tab 42a is heated relatively slowly, the entire junction tab will expand before deposition layer 70 forms on surface 45. Then, when surface 45 reaches the critical temperature, deposition layer 70 will form thereon. If deposition layer 70 is an oxide layer and junction tab 42a is formed from stainless steel, then oxide layer 70 will have a lower coefficient of thermal expansion than will junction tab 42a. Thus, as the deposition layer 70/junction tab 42a combination cools, deposition layer 70 will contract less than surface 45 of junction tab 42a. Thus, as shown in FIG. 19c, junction tab 42a will bend in a direction away from surface 45 on which deposition layer 70 is formed. As discussed below, the effect of the net expansion of surface 46 with respect to surface 45, or equivalently, the net contraction of surface 45 with respect to surface 46, can be used to bend, contract, and/or twist a junction tab. Laser beam 75 can be generated by any standard laser, such as a $CO_2$ or Nd:YAG, so long as it will sufficiently heat junction tab 42a.

Methods of forming a deposition layer on a junction tab other than heating the junction tab with a laser, are also within the ambit of the present invention. For example, a junction tab could be heated using other methods. Or, a deposition layer could be formed using other methods of forming such layers such as plasma-assisted chemical vapor deposition, radio frequency plasma-assisted chemical vapor deposition, direct current plasma-assisted chemical vapor deposition or any other electrochemical deposition technique. Such techniques are fully disclosed in U.S. Pat. No. 5,663,854, issued on Sep. 2, 1997 to Grill et al., which is incorporated in its entirety herein by reference. Mechanical deposition processes, such as processes which use bombardment and/or evaporation, are also contemplated.

It is to be understood that formation of a deposition layer on a junction tab generally places the surface of the junction tab beneath the deposition layer under stress. As such, removal of the deposition layer, or a portion thereof, can act to deform a junction tab by relieving stresses in the junction tab. Any method to remove a deposition layer or portion thereof is contemplated. One such known method is laser ablation. Accordingly, a desired junction tab deformation can be achieved by forming a relatively large deposition layer over the junction tab and then removing portions of the layer to achieve the desired configuration.

A third method to contract or expand a surface or surfaces of a junction tab involves heating a surface, but not to temperatures high enough to form a deposition layer. Accordingly, dislocations and/or voids in the crystal structure of the surface being heated can be removed, and/or the crystal structure of the surface being heated can be changed to a more compact structure, for example, a body-centered-cubic crystal structure can be changed to a face-centered-cubic structure. In this way, the surface or portion of the surface of the junction tab being heated can be contracted with respect to the remainder of the junction tab to cause a desired deformation of the junction tab.

Figures 20A, 20B:
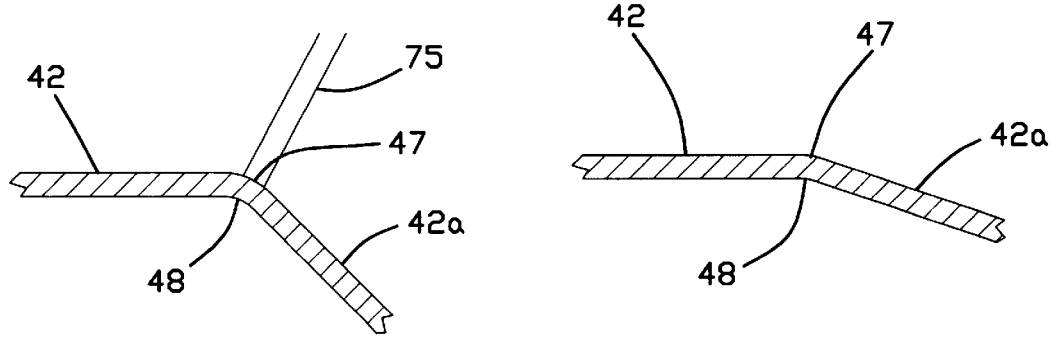
FIG. 20a is a partial sectional side view of the attachment isolation structure shown in FIG. 1 illustrating a junction tab and attachment area thereof being exposed to a laser beam.
FIG. 20b is a partial sectional side view of attachment area and junction tab shown in FIG. 20a having a reduced bend.

One method for heating a surface of a junction tab involves use of a laser. As shown in FIGS. 20a and 20b, which are side views of a portion of junction tab 42a where it connects to attachment area 42, a formed or bent surface 47 can be heated with laser beam 75 emanating from a laser (not shown). The heat from the laser beam 75 can act on the crystal structure in the area of bent surface 47 to remove voids and/or dislocations thereof, and/or alter the crystal structure of junction tab 42a in the area of bent surface 47 to be more compact. In this way, bent surface 47 is contracted. However, the bent surface 48 opposing bent surface 47 does not get as hot as the area of bent surface 47 because it is not being directly hit with beam 75 and the thickness of junction tab 42a acts to partially thermally insulate surface 48 from the heat produced by laser 75 on surface 47. Accordingly, bent surface 48 does not permanently contract as much as bent surface 47 (and may temporarily expand due to thermal expansion from the heat it does receive) and, as shown in FIG. 20b, the angle of bend in junction tab 42a decreases.

Another method of using the heat generated by a laser to deform a junction tab involves "laser forming" or "laser bending." One surface of a junction tab is exposed to a laser beam. This causes a thermal gradient across the thickness of the junction tab perpendicular to the surface. Different sections of the junction tab across the thermal gradient will expand different amounts. The area of the junction tab not effected by the laser heating (that is, the area of the junction tab not exposed to the laser beam) works against the expanding material and imparts a compressive stress on the heated location. This will cause the junction tab to cup towards the laser. Alternately, the entire junction tab can be heated (as with a laser having a relatively larger diameter beam) so that there is effectively no area of the junction tab not effected by the laser. In this way, compressive stresses exerted on the effected area are reduced, and the junction tab will cup away from the laser.

Any of these methods can be used to deform junction tabs in a number of different ways. For example, the method described above and illustrated in FIGS. 19a and 19b to contract one surface 45 of junction tab 42a with respect to the opposite surface 46 thereof can be used to contract the overall length of junction tab 42a. After forming oxide layer 70 on surface 45 using laser beam 75, an oxide surface of approximately the same size as oxide layer 70 can be formed on surface 46 also using laser beam 75. This will contract surface 46 with respect to surface 45, thereby removing the bend in junction tab 42a and contracting the length of the entire tab. Similarly, the method described above and illustrated in FIGS. 20a and 20b can also be used to contract entire length of junction tab 42a by removing voids and/or discontinuities and/or altering the crystal structure of both surfaces 47 and 48 by using laser beam 75 on both surfaces 47 and 48. This can be done whether the surfaces being contracted are initially bent or straight.

Figure 21A:
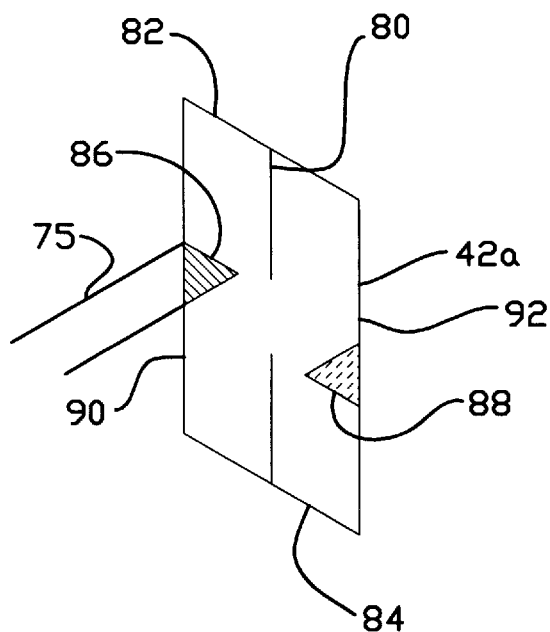
FIG. 21a is a partial front view of the attachment isolation structure shown in FIG. 1 illustrating a junction tab thereof being exposed to a laser beam.

Additionally, junction tabs can be twisted using either the oxide forming method or the void removal/structure changing method described above. FIG. 21 a is a top view of junction tab 42a showing central longitudinal axis 80 down a center thereof Central longitudinal axis divides junction tab 42a into two lateral portions 82 and 84. By twisting it is meant that lateral portion 82 passes out of a plane of junction tab 42a in an un-deformed state, and lateral portion 84 passes out of such a plane in an opposite direction to lateral portion 82. To accomplish this, a triangular area 86 on one surface of lateral portion 82 is exposed to laser beam 75. It is contemplated that either an oxide layer is formed over area 86 or that voids and/or dislocations in area 86 are diminished and/or the crystal structure of area 86 is altered to be more compact. So exposing triangular area 86 to laser 75 will contract an area along edge 90 of lateral portion 82 more so than an area of lateral portion 82 adjacent to axis 80. This is because triangular area 86 is wider at edge 90 and narrows towards axis 80. In this way, when forming an oxide layer, less area along edge 90 will continue to expand after a triangular oxide layer is formed over area 86 than along axis 80, because less expansion deterring oxide is formed adjacent to axis 80. When simply heating area 86 to alter the structure of the surface of junction tab 42a thereat, more area along edge 90 will contract than along axis 80.

Figure 21B:
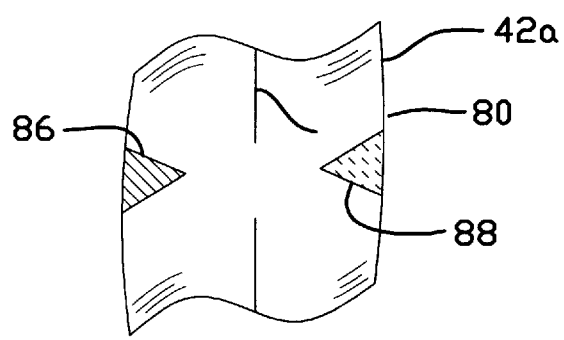
FIG. 21b is a partial front view of the junction tab shown in FIG. 16a after being twisted.

In this way, lateral portion 82 will cup and extend out of the plane of junction tab 42a in an un-deformed state. In the same way, by exposing a triangular area 88 in lateral portion 84 of junction tab 42a on the opposite surface of area 86, lateral portion 84 will "cup" in an opposite direction, as shown in FIG. 21b, thereby twisting junction tab 42a.

It is to be understood that the methods of deforming junction tabs described above and illustrated in FIGS. 19a, 19b, 20a, 20a, 21a, and 21b serve only as examples. As noted above, any deformation which can be created by forming an oxide layer on a junction tab or by altering voids and/or deformations and/or altering the crystal structure in a junction tab is also within the ambit of the present invention.

Figure 22:
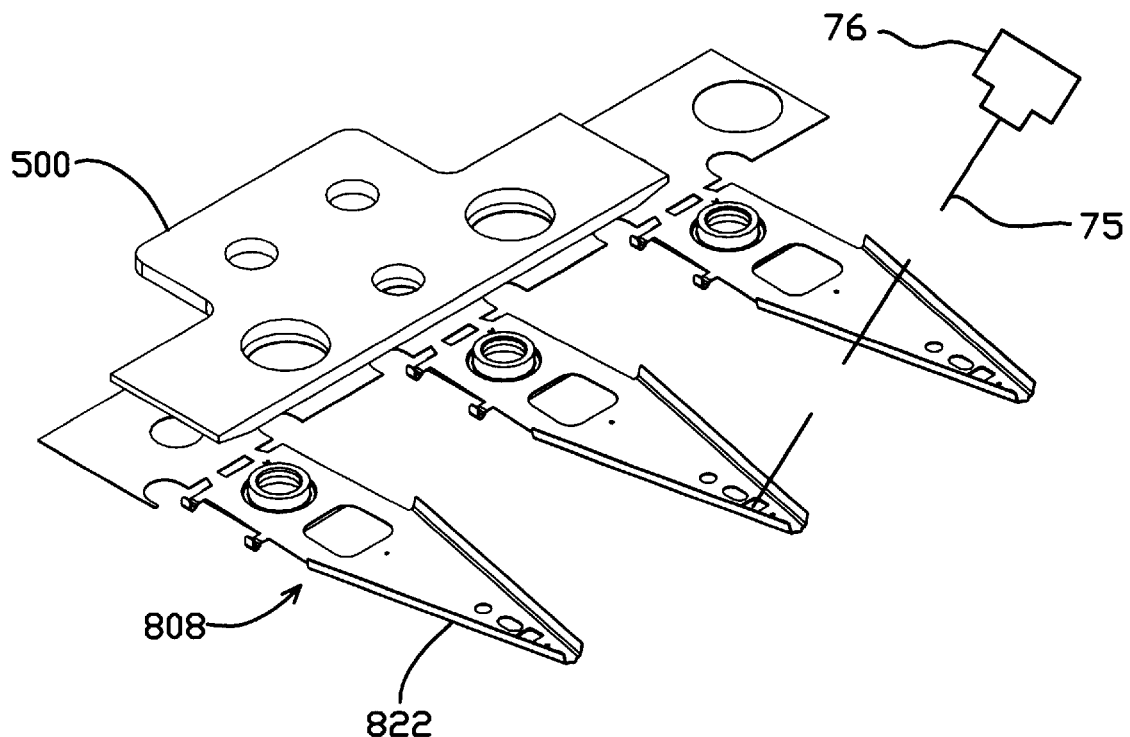
FIG. 22 is an isometric view of a plurality of head suspensions attached to a carrier strip illustrating one of the head suspensions in position for exposure to a laser beam.
Figure 23:
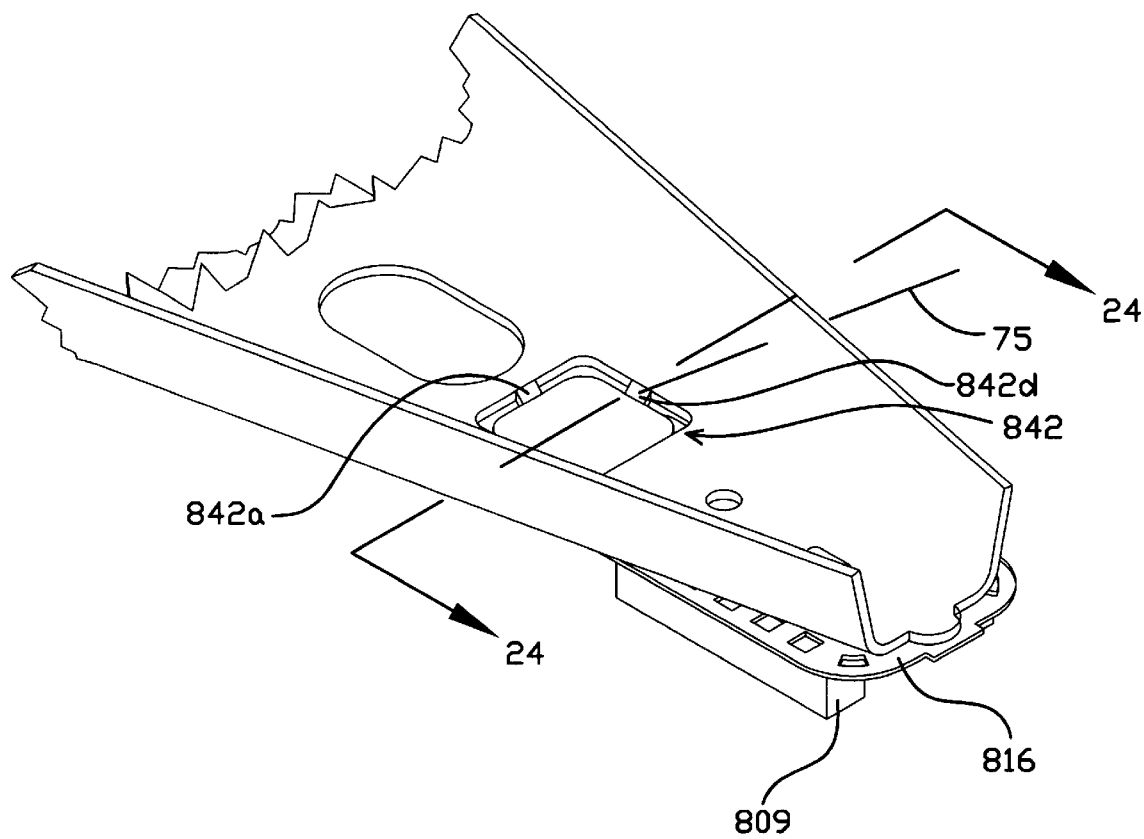
FIG. 23 is an enlarged view of one of the head suspension shown in FIG. 22 illustrating a junction tab being exposed to a laser beam.

The above described methods of using a laser beam to permanently deform junction tabs can be used to correct static attitude of a head slider. FIG. 22 shows an isometric view of plurality of head suspensions 808 each of which is identical to head suspension 8 and has the same components thereof Head suspensions 808 are mounted to a processing strip 825 which is preferably held by a fixture 500. Fixtures such as fixture 500 are well known in the art. The initial static attitude of head slider 809 or head slider bond pad 807, shown in FIG. 23, can be measured using known methods. If adjustment in static attitude is desired, as shown in FIG. 23, a laser beam 75 emanating from laser 76 can be focused at the appropriate area of each junction tab 842a–842d which is to be permanently deformed to make the desired adjustment in static attitude. It is contemplated that laser beam 75 can be focused sequentially on a number of areas of junction tabs 842a–842d or that a number of lasers (not shown) can be used simultaneously on junction tabs 842a–842d. Methods for supporting and focusing a laser or lasers at different areas on a work object are well known in the art. In this way, junction tabs 842a–842d can be permanently deformed such that attachment area 842 is moved in the pitch and/or roll directions to appropriately adjust the static attitude of head slider 809 as described above.

It is contemplated that each junction tab 842a–842d which must be permanently deformed can be so deformed using laser beam 75. It is also contemplated that fewer that all of junction tabs 842a–842d can be deformed by laser 75 such that those junction tabs 842a–842d which are not deformed using laser beam 75 will be deformed via the motion of attachment area 842 in response to the junction tabs 842a–842d which are permanently deformed by laser beam 75. After exposing any or all of junction tabs 842a–842d to laser beam 75, the static attitude of head slider 809 can be re-measured. If further adjustment is necessary, the above process can be repeated. It is also contemplated to deform junction tabs 842a–842d using laser beam 75 while simultaneously measuring the static attitude of head slider 9.

Which junction tabs are to be deformed on a head suspension and the specific deformation (bending, changing length, twisting, etc.) which is to be used on each junction tab depends upon a number of factors including: how many junction tabs are used with the specific attachment isolation structure; how the junction tabs are spaced around the attachment area (e.g. opposing each other or spaced at 90 degree intervals or other intervals); how the junction tabs are formed (e.g. spiral, rectangular); how the junction tabs are oriented with the load beam (e.g. along the pitch axis, along the roll axis, or having components along both the pitch and the roll axis); and the specific adjustment in static attitude of the head slider which is desired (e.g. clockwise, counterclockwise, in the pitch direction, roll direction, or a superposition of both).

Figure 24A:
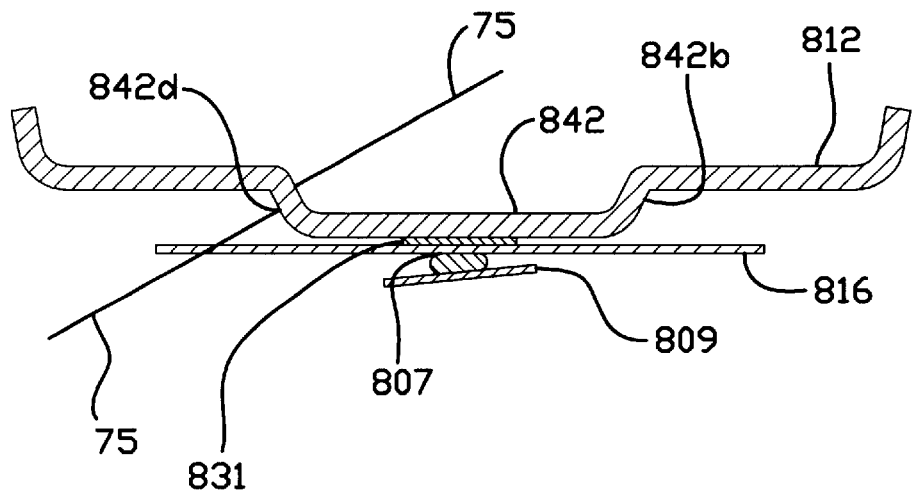
FIG. 24a is a sectional view the head suspension shown in FIG. 23 taken along section line 24—24 of FIG. 23.
Figure 24B:
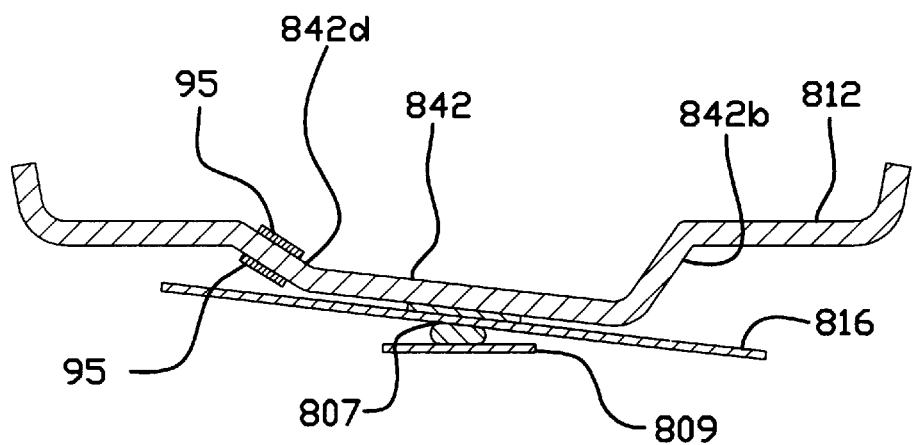
FIG. 24b is an alternate sectional view of the head suspension shown in FIG. 23 taken along section line 24—24 of FIG. 23 illustrating an adjustment of the static attitude of head slider 9.

For example, as shown in FIG. 24a, which is a sectional view of head suspension 808 taken along line 24—24 of FIG. 23, if the initial static attitude of head slider 809 is determined to have a counterclockwise roll error (viewing head suspension and head slider 809 as shown in FIG. 23), it would be possible to correct this error by applying a clockwise roll torque to flexure 816. As shown in FIG. 24b, this can be accomplished by contracting the length of junction tab 842d. By so doing, part of attachment area 842 will rotate upwards, closer to the surface of load beam 812, causing a clock-wise rotation of attachment area 842. Junction tabs 842a, 842b and 842c will deform to follow the rotation of attachment area 842. As shown in FIG. 24a, the total length of junction tab 842d can be contracted by exposing both surfaces of junction tab 842d to laser 75 to form oxide layers 95 thereon.

By using any of the above methods which use a laser beam to permanently deform junction tabs to displace an attachment area and place a torque on a flexure, the static attitude of a head slider can be advantageously adjusted with little physical manipulation of head suspension 808.

Figure 25:
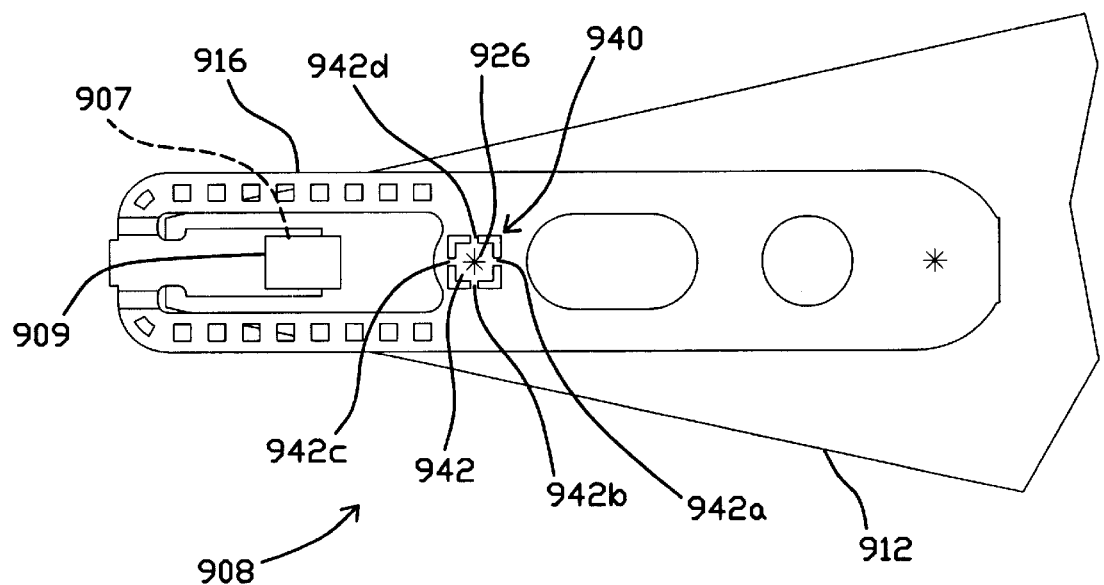
FIG. 25 is a bottom view of an alternate embodiment of a head suspension in accordance with the present invention having an attachment isolation structure formed in the flexure.

An alternative embodiment of a head suspension including an attachment isolation structure for adjusting head slider static attitude is shown in FIG. 25. FIG. 25 is a partial bottom view of a head suspension 908 having load beam 912 with flexure 916 mounted thereto. Rather than having an attachment isolation structure formed in load beam 912, as described above with respect to head suspension 8, attachment isolation structure 940 is formed in flexure 916.

Like attachment isolation structure 40 of head suspension 8, attachment isolation structure 940 includes four junction tabs 942a, 942b, 942c and 942d, and an attachment area 942 suspended thereby. Attachment area 942 is attached by adhesive, weld or other known means to the bottom of load beam 912 at attachment point 926. Effectively, attachment isolation structure 940 is inverted with respect to attachment isolation structure 40 of head suspension 8. Accordingly, the static attitude of head slider 909 attached to head slider bond pad 907 of flexure 916 can be accomplished, as detailed above, by deforming junction tabs 942a–942d. The effect of such deformations on the static attitude of head slider 909 is the same as that described above with respect to deformations of junction tabs 42a–42d in effecting the static attitude of head slider 9 of head suspension 8.

Though the present invention has been described with reference to preferred embodiments, those skilled in the art will recognize that changes can be made in form and detail without departing from the spirit and scope of the invention.

What is claimed is:

1. A method of adjusting the static attitude of a slider bond pad of a head suspension for use in a rigid disk drive, comprising the steps of:

providing a head suspension including:
    a flexure having a slider bond pad for supporting a head slider;
    a load beam supporting the flexure and having a mounting region at a proximal end, a rigid region distally spaced from the mounting region, and a spring region between the mounting region and the rigid region;

forming at least one attachment isolation structure at a location where the load beam is attached to the flexure, the attachment isolation structure comprising:
    an attachment area where at least a portion of the flexure is attached to the load beam;
    at least one isolation slot surrounding at least a portion of the attachment area; and
    at least one junction tab traversing the isolation slot and for connecting the attachment area to the head suspension;

attaching the flexure to the load beam at the attachment area of the attachment isolation structure; and permanently deforming the junction tab to cause a displacement of the attachment area to adjust the static attitude of the slider bond pad.

2. The method of claim 1 wherein the step of permanently deforming the junction tab includes permanently deforming the junction tab by displacing the attachment area to which the junction tab is connected.

3. The method of claim 2 wherein the step of permanently deforming the junction tab includes permanently deforming the junction tab by applying mechanical force to the attachment area to displace the attachment area.

4. The method of claim 1 wherein the step of permanently deforming the junction tab includes the additional steps of:

forming a deposition layer over at least a portion of the junction tab;

heating the junction tab to allow portions of the junction tab not covered by the deposition layer to expand more than the portion of the junction tab covered by the deposition layer, thereby deforming the junction tab.

5. The method of claim 4 wherein the step of forming a deposition layer over at least one portion of the junction tab includes forming an oxide layer over at least a portion of the junction tab by heating the portion of the junction tab with a laser beam.

6. The method of claim 1 wherein the step of permanently deforming the junction tab includes permanently deforming the junction tab by altering the crystal structure of at least a portion of the junction tab to contract the portion of the junction tab.

7. The method of claim 6 wherein the step of permanently deforming the junction tab by altering the crystal structure of at least a portion of the junction tab includes permanently deforming the junction tab by heating at least a portion of the junction tab with a laser.

8. The method of claim 1 wherein the step of providing a head suspension includes providing the head suspension having the attachment isolation structure formed in the load beam.

9. The method of claim 8 wherein the step of providing the head suspension includes providing the head suspension having an attachment isolation structure comprising:

plural isolation slots delineating the attachment area from the load beam; and plural junction tabs connecting the attachment area to the load beam.

10. The method of claim 9 wherein the step of permanently deforming the junction tab includes permanently deforming the plural junction tabs connecting the attachment area to the remainder of the load beam.

11. The method of claim 1 further including the step of measuring the static attitude of the slider bond pad with the load beam in a loaded state prior to permanently deforming the junction tab.

12. The method of claim 11 further including the step of re-measuring the static attitude of the slider bond pad with the load beam in a simulated loaded state after permanently deforming the junction tab.

13. The method of claim 1 wherein the step of permanently deforming the junction tab includes permanently deforming the junction tab to cause a rotation of the attachment area in a roll direction such that a roll torque is placed on the flexure which will cause a rotation of the slider bond pad in the roll direction, the rotation of the slider bond pad in the roll direction acting to adjust the static attitude of the slider bond pad.

14. The method of claim 1 wherein the step of permanently deforming the junction tab includes permanently deforming the junction tab to cause a rotation of the attachment area in a pitch direction such that a pitch torque is placed on the flexure which will cause a rotation of the slider bond pad in the pitch direction, the rotation of the slider bond pad in the pitch direction acting to adjust the static attitude of the slider bond pad.

15. The method of claim 1 wherein the step of permanently deforming the junction tab includes permanently deforming the junction tab to cause a rotation of the attachment area in a superposition of a pitch and a roll direction such that a pitch torque and a roll torque is placed on the flexure which will cause a rotation of the slider bond pad in the superposition of the pitch and roll directions, the rotation of the slider bond pad in the superposition of the pitch and roll directions acting to adjust the static attitude of the slider bond pad.

16. The method of claim 1 wherein the step of permanently deforming the junction tab includes permanently deforming the junction tab by contracting at least a portion of the junction tab.

17. The method of claim 1 wherein the step of permanently deforming the junction tab includes permanently deforming the junction tab by expanding at least a portion of the junction tab.

18. The method of claim 1 wherein the step of permanently deforming the junction tab includes permanently deforming the junction tab by twisting at least a portion of the junction tab.

19. The method of claim 1 wherein the step of permanently deforming the junction tab includes permanently deforming the junction tab by bending at least a portion of the junction tab.

20. The method of claim 1 wherein the step of providing a head suspension includes providing the head suspension having the attachment isolation structure formed in the flexure.

21. The method of claim 1 wherein the step of attaching the flexure to the load beam at at least the attachment area of the attachment isolation structure includes welding the flexure to the load beam at at least the attachment area of the attachment isolation structure.

22. The method of claim 1 wherein:

the head slider is mounted to the head slider bond pad; and the step of permanently deforming the junction tab includes permanently deforming the junction tab to cause a displacement of the attachment area to adjust the static attitude of the head slider.

23. A method of making a head suspension with a slider bond pad oriented at a determined static attitude for use in a rigid disk drive, comprising the steps of:

providing a flexure having a slider bond pad for supporting a head slider;

providing a load beam for supporting the flexure and having a mounting region at a proximal end, a rigid region distally spaced from the mounting region, and a spring region between the mounting region and the rigid region;

forming at least one attachment isolation structure located substantially at the location where the flexure is attached to the load beam, the attachment isolation structure comprising:

an attachment area for attaching at least a portion of the flexure to the load beam;

at least one isolation slot surrounding at least a portion of the attachment area; and at least one junction tab traversing the isolation slot and for connecting the attachment area to the remainder of the head suspension;

attaching the flexure to the load beam at the attachment area of the attachment isolation structure; and permanently deforming the junction tab to cause a displacement of the attachment area to adjust the static attitude of the slider bond pad.

24. The method of claim 23 wherein the step of providing a head suspension includes providing the head suspension having the attachment isolation structure formed in the load beam.

25. The method of claim 23 wherein the step of providing a head suspension includes providing the head suspension having the attachment isolation structure formed in the flexure.

* * * * *